(12) United States Patent
Zhang

(10) Patent No.: US 10,297,888 B2
(45) Date of Patent: May 21, 2019

(54) METHOD AND SYSTEM FOR STORING ELECTRICITY IN METALS

(71) Applicant: e-Zn Inc., Toronto (CA)

(72) Inventor: Xiaoge Gregory Zhang, Toronto (CA)

(73) Assignee: e-Zn Inc., Toronto (CA)

( * ) Notice: Subject to any disclaimer, the term of this patent is extended or adjusted under 35 U.S.C. 154(b) by 533 days.

(21) Appl. No.: 15/053,983

(22) Filed: Feb. 25, 2016

(65) Prior Publication Data

US 2016/0329618 A1  Nov. 10, 2016

Related U.S. Application Data

(60) Provisional application No. 62/158,214, filed on May 7, 2015.

(51) Int. Cl.

| | |
|---|---|
| *H01M 12/08* | (2006.01) |
| *H01M 8/083* | (2016.01) |
| *H01M 10/48* | (2006.01) |
| *H01M 8/04828* | (2016.01) |
| *H01M 10/44* | (2006.01) |
| *H01M 8/18* | (2006.01) |
| *H01M 8/04313* | (2016.01) |
| *H01M 8/0444* | (2016.01) |
| *H01M 8/04537* | (2016.01) |

(52) U.S. Cl.
CPC ......... *H01M 12/08* (2013.01); *H01M 8/0444* (2013.01); *H01M 8/04537* (2013.01); *H01M 10/44* (2013.01); *H01M 10/48* (2013.01); Y02E 60/128 (2013.01)

(58) Field of Classification Search
CPC ...... H01M 10/44; H01M 10/48; H01M 12/08; H01M 8/0444; H01M 8/04537; H01M 8/184; H01M 8/22; H01M 8/225; Y02E 60/128; Y02E 60/528
See application file for complete search history.

(56) References Cited

U.S. PATENT DOCUMENTS

| | | |
|---|---|---|
| 3,758,342 A | 9/1973 | Baba |
| 3,879,225 A | 4/1975 | Backhurst et al. |
| 3,977,903 A | 8/1976 | Jacquelin |
| 3,981,747 A | 9/1976 | Doniat et al. |

(Continued)

OTHER PUBLICATIONS

Gregory X. Zhang, "A dual power cell for storing electricity in zinc metal," Journal of Power Sources 285 (2015) 580-587.

(Continued)

*Primary Examiner* — Barbara L Gilliam
*Assistant Examiner* — Adam A Arciero
(74) *Attorney, Agent, or Firm* — Knobbe, Martens, Olson & Bear LLP

(57) ABSTRACT

A method for operating an electrochemical cell system for storing electrical energy in metallic material comprising a cell housing containing an electrolyte, a metallic material, a charging assembly for deposition of the metallic material, a discharging assembly for dissolution of the metallic material, and a space for storing the metallic material. The method comprises determining the metal concentration in the electrolyte and a software algorithm for determining the operation parameters such as the currents and voltages of the system as well as the schedules for electrolyte circulation and dislodging of deposited metallic materials.

20 Claims, 22 Drawing Sheets

(56) References Cited

U.S. PATENT DOCUMENTS

| | | | |
|---|---|---|---|
| 4,126,733 | A | 11/1978 | Doniat |
| 4,147,839 | A | 4/1979 | Solomon et al. |
| 4,172,924 | A | 10/1979 | Warszawski |
| 4,198,475 | A | 4/1980 | Zaromb |
| 4,341,847 | A | 7/1982 | Sammells |
| 4,719,156 | A | 1/1988 | Niksa et al. |
| 5,006,424 | A | 4/1991 | Evans et al. |
| 5,196,275 | A | 3/1993 | Goldman et al. |
| 5,208,526 | A | 5/1993 | Goldman et al. |
| 5,434,020 | A | 7/1995 | Cooper |
| 5,607,788 | A | 3/1997 | Tomazic |
| 5,849,427 | A | 12/1998 | Siu et al. |
| 5,952,117 | A | 9/1999 | Colborn et al. |
| 6,706,433 | B2 | 3/2004 | Pinto |
| 8,236,440 | B2 | 8/2012 | Bendert |
| 8,293,390 | B2 | 10/2012 | Winter |
| 2004/0053132 | A1 | 3/2004 | Smedley |
| 2004/0140222 | A1 | 7/2004 | Smedley |
| 2005/0098442 | A1* | 5/2005 | Smedley ............ C25C 5/02 205/369 |
| 2010/0002130 | A1 | 1/2010 | Kamio |
| 2010/0021303 | A1 | 1/2010 | Nielsen et al. |
| 2010/0031693 | A1 | 2/2010 | Yuyama |
| 2010/0196768 | A1 | 8/2010 | Roberts et al. |
| 2010/0316935 | A1 | 12/2010 | Friesen |
| 2010/0330437 | A1 | 12/2010 | Burchardt |
| 2011/0117456 | A1 | 5/2011 | Kim et al. |
| 2013/0025206 | A1 | 1/2013 | Suzuki |
| 2013/0252062 | A1 | 9/2013 | Wilkins et al. |
| 2013/0280623 | A1 | 10/2013 | Yoshida et al. |
| 2013/0285597 | A1 | 10/2013 | Goldstein |
| 2014/0065460 | A1 | 3/2014 | Evans |
| 2015/0056524 | A1 | 2/2015 | Zhang |

OTHER PUBLICATIONS

John Cooper, "Powering Future Vehicles with Refuelable Zinc/Air Battery," Science & Technology Review, Oct. 1995, pp. 6-13.

International Search Report and Written Opinion dated Jan. 15, 2015 for PCT/IB2014/002144.

M. Skyllas-Kazacos et al., "Progress in Flow Battery Research and Development," Journal of the Electrochemical Society, vol. 158 (8) R55-R79 (2011).

S. Smedley and X.G. Zhang, "Zinc-Air: Hydraulic Recharge", in Encyclopedia of Electrochemical Power Sources, Eds. Jungen Garche etc. Amsterdam: Elsevier, 2009.

X.G. Zhang, Corrosion and Electrochemistry of Zinc, Springer and Zinc Electrodes, Encyclopedia of Electrochemical Power Sources, Elsevier.

P.C. Butler et al., "Zinc/Bromine Batteries in Handbook of Batteries," McGraw Hill, Chapter 39; pp. 39.1-5 (Published prior to 2013).

X.G. Zhang, "Zinc Electrodes" in Encyclopedia of Electrochemical Power Sources, Eds. Jungen Garche etc., Amsterdam, Elsevier, 2009.

\* cited by examiner

METHOD AND SYSTEM FOR STORING ELECTRICITY IN METALS

BACKGROUND OF THE INVENTION

Field of the Invention

This invention relates to electrochemical technologies for electrical energy storage and particularly relates to metal-air batteries, fuel cells and flow batteries.

Description of the Related Art

Electricity storage is an important enabling technology for effective use of renewable energy sources such solar and wind. There are two broad categories of electricity storage applications based on the duration of storage: short durations, from a fraction of second to about one hour, and long durations, from a few hours to ten or hundred of hours. The short duration types are typically used for power support to ensure the reliability and quality of electrical power for which there are technologies in the early stage of commercial application. Long duration types are needed for applications to separate the times between generation and use of electricity at low cost. At present there is a lack of commercially viable technology for long duration type of electricity storage except for pumped hydro. However, pumped hydro is limited by availability of suitable lands due to geological environmental constrains.

Metal-air, particularly zinc-air, electrochemical systems have long been seen as promising technologies for low cost large scale energy storage. There have been continuous attempts to develop energy storage systems based on zinc-air chemistry including rechargeable batteries, mechanically and hydraulically rechargeable fuel cells (see review articles by X. G. Zhang: "Zinc Electrodes", and S. Smedley and X. G. Zhang, "Zinc-Air: Hydraulic Recharge", in Encyclopedia of Electrochemical Power Sources, Eds. Jungen Garche etc., Amsterdam: Elsevier, 2009).

Electrically rechargeable zinc-air batteries have high energy density. The main technical issues have been fast degradation of the bi-functional air cathode and the detrimental change of the morphology of zinc anode during cyclic discharging and charging. Numerous development efforts have been made to resolve these technical challenges. Some recent developments can be appreciated, for example, from US patent application publications US2010/0021303 (published 28 Jan. 2010) and US2010/0316935 (published 16 Dec. 2010).

For zinc-air fuel cells, the zinc active anode material is like fuel and can be generated and regenerated by electro deposition. The generation of zinc material by electro deposition serves the function of storing electricity. The deposited metallic material together with electrolyte in fluidic form is fed or fueled into the fuel cells, which serves the function of generating electricity from the stored energy in the metallic zinc. Regenerative zinc fuel cells are ideal for economical long duration energy storage for three fundamental reasons: 1) power generation and energy storage are separated such that energy can be stored independently at low cost; 2) zinc has a high energy density, highest among the common metals that can be reduced in aqueous electrolytes and 3) zinc is inexpensive, one of the lowest cost metals in the market.

Regenerative zinc-air fuel cell systems have many advantages over rechargeable battery systems such as independent scaling of power and capacity and continuous discharging without interruption for charging. Many development efforts have been made on zinc fuel cell technology as can be appreciated in the patent literature, for examples, U.S. Pat. No. 5,434,020 (issued 18 Jul. 1995), U.S. Pat. No. 5,849,427 (issued 15 Dec. 1998), U.S. Pat. No. 6,706,433 (issued 16 Mar. 2004), and US Patent Application Publication US2010/0330437 (published 30 Dec. 2010). The major technical challenges have been clogging or jamming during fuelling or transporting the zinc materials into and out the electrochemical cells and uneven distribution of the materials within a cell and between the cells. Solutions are needed to resolve these technical problems for zinc air fuel cell to function reliably and efficiently.

Metal-redox flow batteries, particularly zinc-redox flow batteries, are another technology system that has been considered having the potential for low cost energy storage. Redox couples of bromine, cerium and iron have been used for development of zinc-redox flow battery technologies, as indicated in literature: Progress in Flow Battery Research and Development (by M. Skyllas-Kazacos et al in Journal of The Electrochemical Society, Vol. 158 (8) R55-R79), 2011, US Patent Application Publication 2013/0252062 (published 26 Sep. 2013), and U.S. Pat. No. 8,293,390 (issued 23 Oct. 2012) and U.S. Pat. No. 5,607,788 (issued 4 Mar. 1997). As well, iron-redox flow battery has also been explored as disclosed in US Patent Application Publication 2014/0065460 (published 6 Mar. 2014). However, in the current designs of metal-redox flow batteries the capacity of the batteries is limited by the thickness of the metal anodes.

SUMMARY OF THE INVENTION

One aspect of this invention provides a method for operating an electrochemical cell system for storing electricity in metals. The electrochemical cell system comprises a cell housing containing an electrolyte, a metallic material, a charging assembly for electrochemical deposition of the metallic material, a discharging assembly for electrochemical dissolution of the metallic material, and a space for storing the metallic material. The charging assembly comprises a plurality of charging cathodes and charging anodes and discharging assembly comprises a plurality of discharging cathodes and a plurality of spaces between the discharging cathodes. The metallic material, when placed in the spaces between the discharging cathodes, forms a plurality of discharging anodes. The electrochemical cell system further comprises a motion mechanism for dislodging the metallic material and a pump for circulating the electrolyte within the housing, and sensors for measuring the temperature and concentration of electrolyte. The system may further comprises other structures and components: a reservoir for containing more electrolyte or containing a second electrolyte (positive electrolyte), a mechanism for causing stirring effect to the metallic material in the spaces between the discharging cathodes, A further aspect of the present invention provides an operation scheme for connecting and controlling the various elements or components that may be involved in the operation of the system. In this scheme the charging and discharging powers are regulated by a power electronic device which is connected to a power source and a load. The metal concentration of the metallic material in the electrolyte and the electrolyte temperature are measured and the data gathered are sent to a central control device such as a computer. The pumps for transporting and circulating fluids and the motion mechanisms for dislodging and stirring metallic material are controlled by the control device. The control device may also control the power electronic device or may be designed to be a part of the power electronic device.

Another aspect of the present invention provides an operation algorithm that uses parameters measured or specified and determines the operation commands, state of cell system and schedules for components external of the cell housing such as pumps and motion mechanisms. The algorithm comprises calculations and manipulations of the data and information in the system according to a set of rules designed for the specific construction of a cell system and the characteristics of functions and performance matrix required by actual applications. It can be programmed to be in the form of software operated in a computer as the control device. According to one embodiment, the current and voltage of the charging assembly and the current and voltage of the discharging assembly, the temperature, metal concentration of the electrolyte, and time are used as input parameters for the software. The software then determines the state of the electrochemical cell system that includes but not limited to depth of charge and discharge, fraction of concurrent charging and discharging, current and energy efficiencies for charging and discharging, impedance of the charging and discharging circuits, and electrolyte level, generates the operational commands with respect to the value or magnitude of the currents and the voltages for charging and discharging, and limits for currents and voltages, and creates schedules for the operation of devices and components such as pumps, dislodging mechanism and sensing devices.

A further aspect of the present invention provides a domain of operation according to the concentration of dissolved metal in the electrolyte and the current density. The system can function in a wide range of concentrations and current densities and is preferably operate in a concentration range between 0.2 M to 2.2 M and in a current density not exceeding 150 mA/cm$^2$ based the apparent surface area of the charging and discharging cathodes. Metal concentration in the electrolyte can be determined through measurement of one or more physical and chemical properties of the electrolyte or through determination of one or more electrical characteristics of charging and discharging such as charging and discharging currents, charging and discharging voltages, current-voltage relationship, impedance, and amount of charge passed during charging or discharging.

In yet a further aspect there is provided a method for operating an electrochemical cell system, the electrochemical cell system comprising: a housing; an electrolyte disposed in the housing; a metallic material; a plurality of charging anodes and a plurality of charging cathodes at least partially immersed in the electrolyte; a plurality of discharging cathodes immersed in the electrolyte; a plurality of anode spaces adjacent the discharging cathodes, and wherein: the metallic material is electrochemically deposited on the charging cathodes during charging; the metallic material, when positioned in the anode spaces, forms a plurality of discharging anodes; and the metallic material is electrochemically dissolved during discharging; the method comprising: determining the metal concentration of the dissolved metallic material in the electrolyte; applying an electric current to the charging cathodes and charging anodes through charging, the ranges of the electric currents being determined according to the metal concentration of the electrolyte; and applying an electrical current to the discharging cathodes and discharging anodes through discharging, the range of the electric currents being determined according to the metal concentration of the electrolyte.

In still a further aspect there is provided a method for operating an electrochemical cell system comprising: storing electricity by electrochemical deposition of a metallic material with a charging assembly comprising a plurality of charging cathodes and a plurality of charging anodes at least partially immersed in an electrolyte contained in a housing; dislodging the metallic material deposits; placing the metallic material in a plurality of anode spaces between a plurality of discharging cathodes in a discharging assembly at least partially immersed in the electrolyte, and the metallic material in the anode spaces forms one or more discharging anodes; generating electricity by electrochemical dissolution of the metallic material in the discharging assembly; wherein the concentration of the metallic material dissolved in the electrolyte in the cell is determined; and the range of the electrical currents or voltages applied to the charging assembly during charging and to the discharging assembly during discharging according to the metal concentration of the electrolyte are determined.

Yet another aspect of the present invention provides a method for operating a plurality of cells connected in series or parallel as a system for energy storage applications.

In a further aspect, methods or systems described herein or portions thereof, can be implemented by programming one or more computer systems or devices with computer-executable instructions embodied in a computer-readable medium.

BRIEF DESCRIPTION OF THE DRAWINGS

These and other features of preferred embodiments will become more apparent in the following detailed description in which reference is made to the appended drawings wherein.

DETAILED DESCRIPTION OF PREFERRED EMBODIMENTS

Figure 1A:
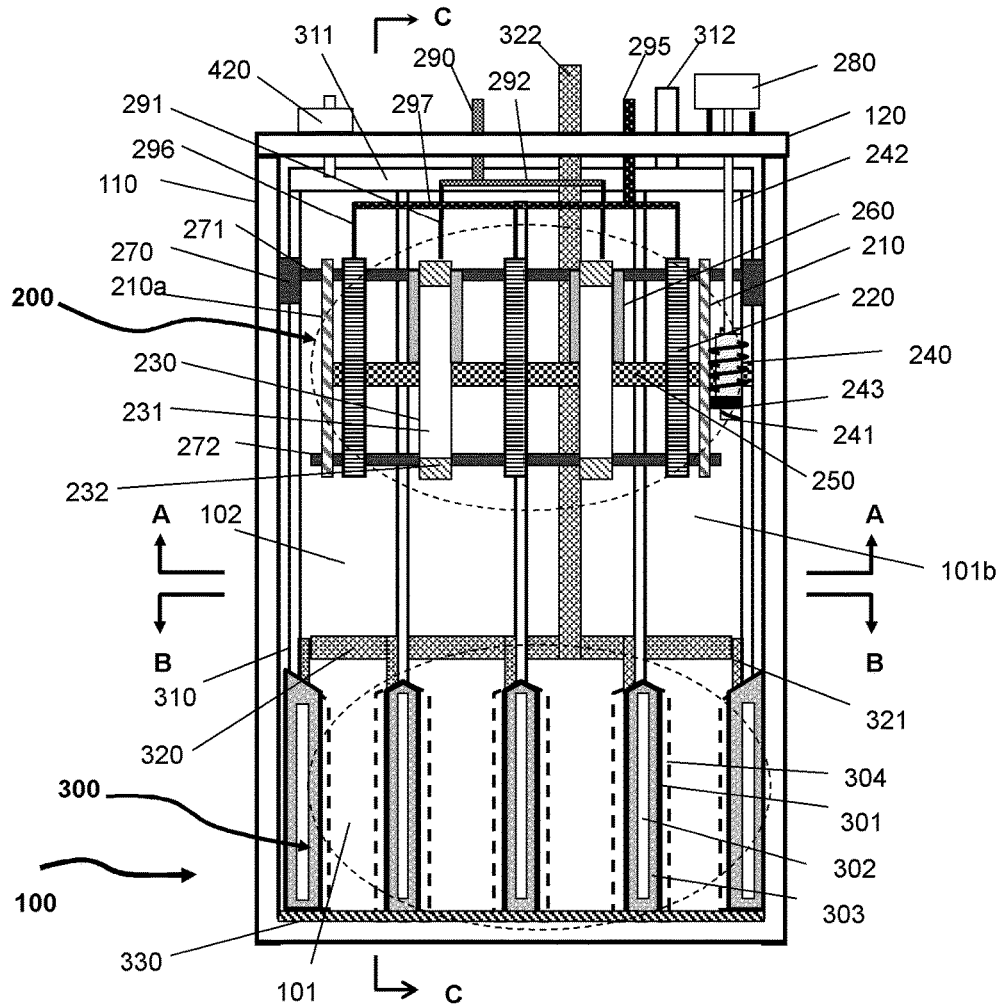
FIG. 1*a* A schematic illustration of the basic elements and structure of the electrochemical cell according to an embodiment where the charging assembly is above of the discharging assembly in the same housing.
Figure 1B:
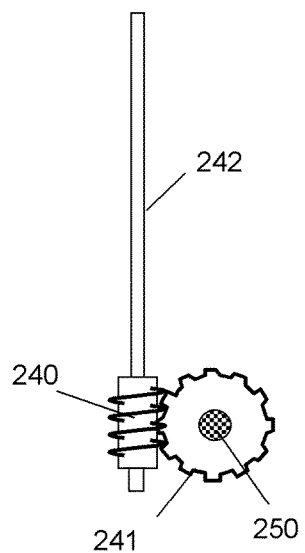
FIG. 1*b* A schematic illustration of the gear mechanism for mobilizing the wipers in the charging assembly.
Figure 2A:
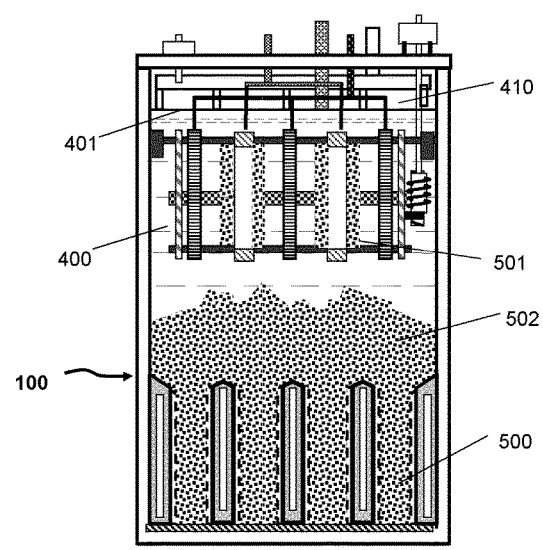
FIG. 2*a* A schematic illustration of the basic elements and structure of the electrochemical cell including electrolyte and deposited metal materials (same as shown in FIG. 1 with omission of some elements for simplicity)
Figure 3:
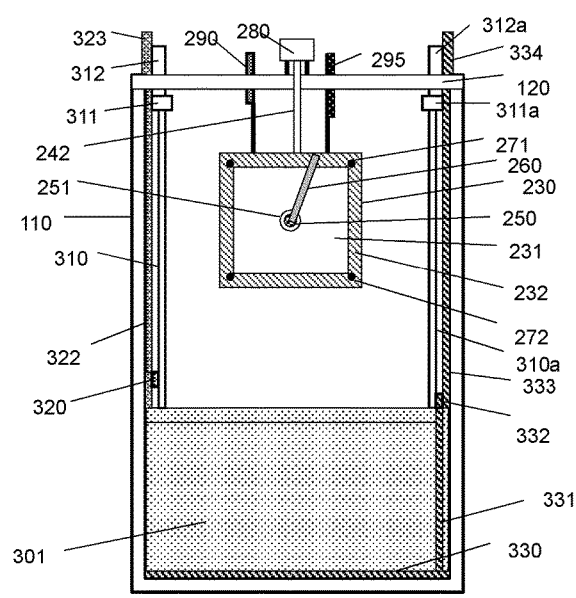
FIG. 3 A schematic illustration of the basic elements and structure of the electrochemical cell viewed from the plane and along the lines C-C in FIG. 1.
Figure 4:
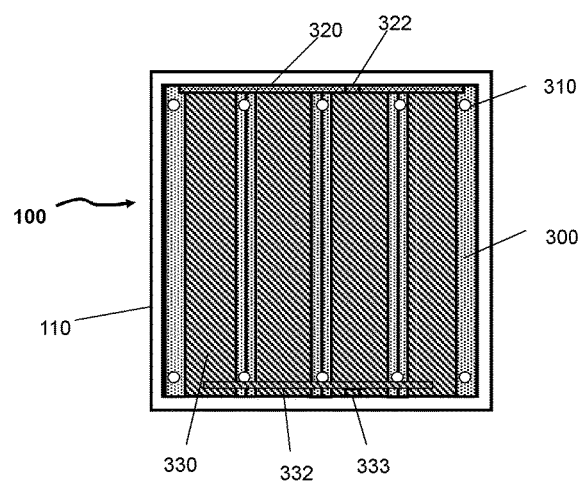
FIG. 4 A schematic illustration of the elements and structure of the electrochemical cell from the plane and along the lines B-B in FIG. 1.
Figure 5:
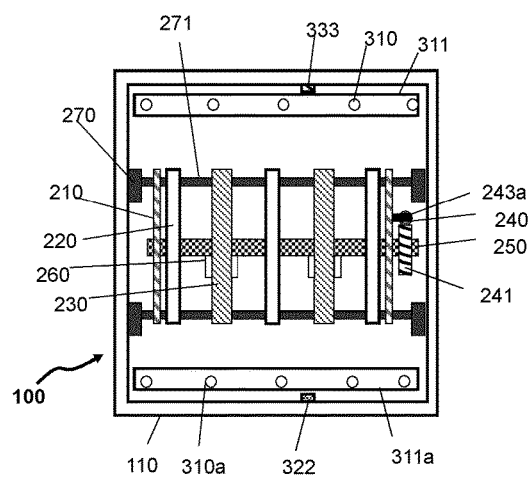
FIG. 5 A schematic illustration of the basic elements and structure of the electrochemical cell viewed from the plane and along the lines A-A in FIG. 1.

An exemplary embodiment of the electrochemical cell uses oxidation and reduction of oxygen in the air and of a metal as the electrochemical reaction couple, of which the basic elements and structure are illustrated in FIG. 1 et al to FIG. 5. FIG. 1a is a schematic illustration of the electrochemical cell without electrolyte and metal. FIG. 2a is a schematic illustration of the electrochemical cell shown in FIG. 1a having electrolyte and deposited metal materials. FIGS. 3a, 4 and 5 are the schematic illustrations viewed from different cross sectional planes and directions indicated in FIG. 1a.

As shown in FIGS. 1a and 2a the electrochemical cell 100 includes a charging assembly 200 (roughly outlined by the dashed line), a discharging assembly 300 (roughly outlined by the dashed line), an electrolyte 400, a container 110 and a number of external components which will be described in the following paragraphs.

Figure 2B:
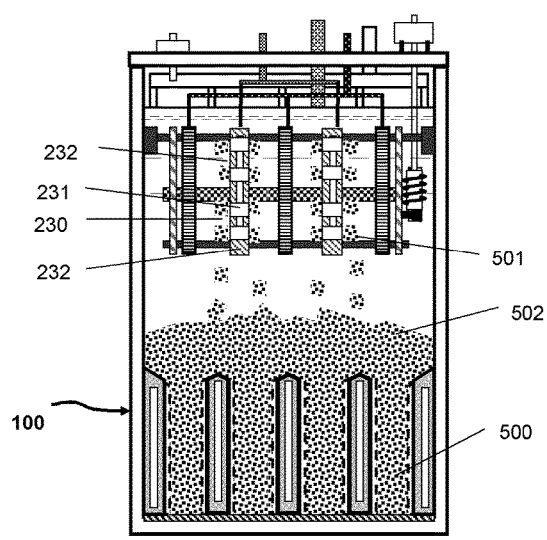
FIG. 2*b* A schematic illustration of the electrochemical cell system in which the cathodes in the charging assembly have a plurality of discrete active surface areas for metal deposition.
Figure 2C:
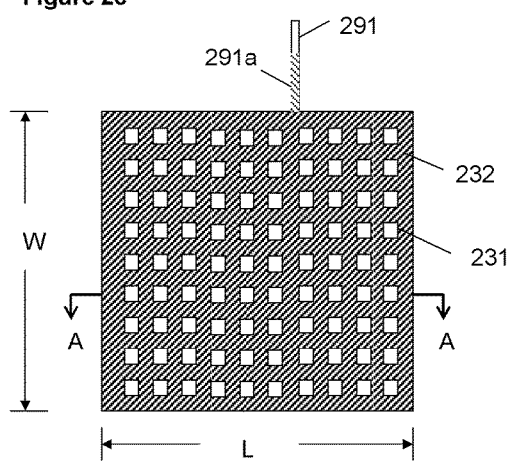
FIG. 2*c* A schematic illustration of a charging cathode with a plurality of discrete areas for deposition of metal.

The charging assembly 200 is located on the top section of the container 110 above the discharging assembly. The charging assembly is in a space 102 (second space) above the discharging assembly. The charging assembly comprises at least one or a plurality of charging cathodes 230 and anodes 220, (only two cathodes and three anodes are illustrated in the figures for simplicity). The charging cathodes and anodes are appropriately spaced to match to the layout of the discharging assembly 300 which will be described further below. The cathodes and anodes of the charging assembly are physically secured on the horizontal bars 271 and 272. Bar 271 is secured onto the container 110 through an attachment fixture 270, for example and not limited to a screw or aperture. The cathodes and anodes may alternatively be mounted directly on the cell container 110. The cathodes comprise a conductive material 231, for example and not limited to magnesium, that is stable in the electrolyte and has low adhesion to the deposited metallic material. The edges of the cathodes are covered by an insulating material 232, for example and not limited to polymeric materials, to prevent metal deposition on the edges. As a variation, the cathode may comprise a plurality of discrete active surface areas as illustrated in FIG. 2b for generating discrete metal deposits. FIGS. 2c and d is an illustration of an example of such a cathode with discrete deposition areas 231 separated by insulating material 232. The total surface area of discrete active surfaces is considerably smaller than the apparent surface area of the physical electrode, which is the length L times the width W for the case illustrated in FIG. 2c.

In the embodiment illustrated in FIG. 1a, the layout of the electrodes of the charging assembly is in parallel to the electrodes of the discharging assembly. Alternatively, it may be structured such that the electrodes of the charging assembly are at perpendicular or at some other angles relative to the electrodes of the discharging assembly.

The mechanism for removing the deposited metallic material comprises wipers 260 mounted on a shaft 250 which is horizontally positioned with end two plates 210 and 210a through the middle of the charging assembly. The rotating motion of the shaft 250 is enabled with a motor 280 through a worm gear mechanism having worm gear elements 240, gears 241, gear shaft 242 and a support base fixture 243 as illustrated in FIG. 1b. Gear 241 is mounted on shaft 250 and gear 240 on a fixture 243 mounted on the end plate 210. The shaft 250 is preferably not in physical contact with the cathodes and anodes to minimize frictional resistance; the holes in the middle of the cathodes and anodes are larger than the diameter of the shaft. Alternatively, instead of rotating wipers, wipers that either moving horizontally or vertically may be used for dislodging the metal deposits from the cathodes surfaces. As a further alternative, the cathodes can be moved relative to the wipers that are fixed. Further alternative embodiments may include other mechanisms such as shaking or vibrating the charging cathodes for removing the metal deposits. The relative easiness in removing or dislodging the deposited metal also depends on the design of the charging cathode, such as the substrate material and the size of the discrete active areas as well as the spacing between the neighbouring areas. The smaller is the active areas the easier for removing the metal deposit since the adhesion is weaker between the metal deposits and the surface of the active areas.

During charging operation the metal in the electrolyte is reduced on the surfaces of the cathodes forming metal deposit 501 as illustrated at FIG. 2a. As the deposits grow on the cathode surface, they are periodically dislodged by wipers 260 from the surfaces and transported by gravity downward into first spaces 101 (anode beds or anode spaces) between the oxygen cathodes of the discharging assembly 300 underneath the charging assembly. The metallic material as metal deposits may pile up into second space 102 to variable heights above of the discharging assembly after the first spaces are filled. The second space may be flexibly scaled in size for containing various amounts of metallic material depending on the designed capacity for an electrochemical cell. The space above the discharging cathode and below the charging electrodes is the actual space for storing extra metallic material and can viewed as the storage space that is a part of the second space.

The electrical current of the cathodes of the charging assembly is conducted to terminal 290 via leads 291 of the cathodes and bus 292. The current of the anodes is conducted to terminal 295 via leads 296 of the anodes and bus 297. The portion of leads 291 that is immersed in electrolyte is covered with an insulating material 291a (shown in FIGS. 2c and d), such as a polymer coating or film to prevent metal deposition on the leads.

For the embodiment shown in FIG. 1a, the discharging assembly 300, located beneath of the charging assembly comprises one or a plurality of oxygen cathodes 301 (discharging cathodes) with one or more first spaces 101 for, as illustrated at FIGS. 1a and b, containing anodes 500 (discharging anodes) comprising the deposited metallic material 501 fallen due to gravity from the charging assembly. More clearly, the metallic material, when it is dislodged from the charging cathodes and is placed in the spaces (first spaces) between the discharging cathodes, forms the discharging anodes. Above the anodes pile 502 in the second space is the metallic material in excess of that in the anode beds or anode spaces (first spaces). The space below the charging assembly and above the discharging assembly is storage space for storage of the metallic material. The current of the anodes is collected by anode current collectors 330 (see FIG. 1a), on the bottom of cell 100, and 331 (see FIG. 3) on the side of the anode beds and is conducted through a horizontal bus 332 and a lead 333 to terminal 334 outside of the cell on the top (see FIGS. 1a and 3). The anode current collectors can be made of copper or other metal alloys and may also vary in size and shape and be placed at different locations in the anode spaces. The current of the oxygen cathodes is conducted to terminal 323 on top of the container via electrical leads 321 of individual oxygen cathodes, bus 320 and lead 322. All surface areas of the current conducting elements for the cathodes, i.e. 320, 321, and 322, that are submerged in the electrolyte is covered with an insulating material or the insulating material to prevent possibility of contact between cathodes and the metallic material.

The anodic electrode (negative electrode) of the discharging assembly may be considered as comprising one anode when all the metallic material in the anode beds is a continuous body and considered as comprising a plurality of anodes when the anode beds are only partially filled by the metallic material with the embodiment in FIGS. 1a, 2a and 2b.

The discharging assembly of the electrochemical system may also comprise a stirring mechanism to stir the metallic material in the anode spaces for enhancing the circulation of the electrolyte mixed amongst the metallic material. The stirring mechanism may comprise a rod or a mesh or a rake like structure that is at least partially positioned in each anode space. The mechanism may be powered by the same motor that powers the dislodging mechanism or alternatively powered by another power device. Alternatively, the stirring mechanism may comprise pipes and nozzles in the anode spaces to create air jets or liquid jets for stirring the metallic material.

Figure 1C:
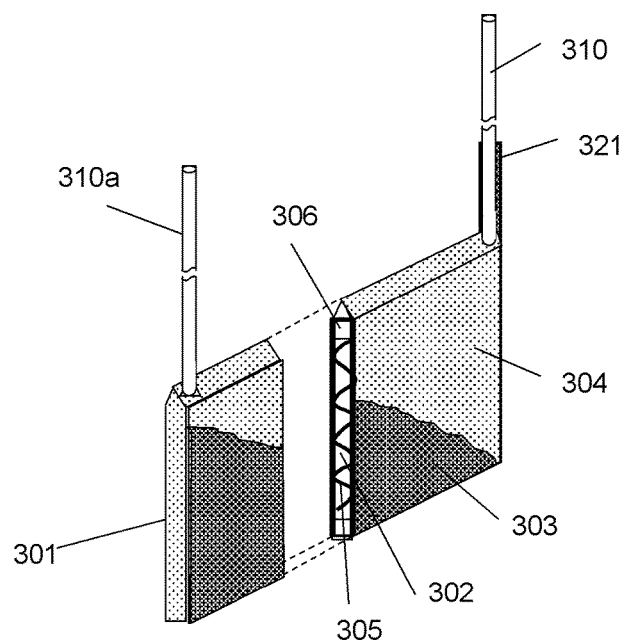
FIG. 1*c* A schematic perspective and cross sectional illustration of the structure of the oxygen cathode in the discharging assembly.

The oxygen cathode 301 in the discharging assembly of the embodiment shown in FIG. 1a is a planar structure with a cavity 302 as illustrated in FIG. 1c. The oxygen cathode comprises a frame 306 covered with two membrane oxygen electrodes 303 that are permeable to air but impermeable to water. The surfaces of the oxygen cathodes are covered with a separator 304 to prevent direct contact between the cathodes and anodes. The oxygen cathode may alternatively be in non-planar structures, for example cylindrical, ring or curved structures. The cavity 302 within the cathode is for holding air or oxygen or a gas containing oxygen to allow the reduction of oxygen. The cavity is completely sealed except for an inlet and an outlet to allow air or gas passing through. The air is supplied into the cavities of the oxygen cathodes by an air pump (not shown in the figures) that is located, as shown at FIG. 3, external of the electrochemical cell via inlet 312, manifold 311 and tubes 310 and leaving the cavity via tubes 310a, manifold 311a and outlet 312a on the top of the container 110. It may be beneficial that tubes 310 and 310a and electric lead 321 (shown at FIG. 1c) are bundled together or made into a single element for simplifying the structure. Alternatively, air or oxygen may be conducted to the oxygen cathode through the side of the cell container. The oxygen membrane electrode 303 is supported with a corrugated board 305 (see FIG. 1c) to prevent yielding of the membrane electrode under the pressure from the surrounding electrolyte.

The oxygen cathode of such design has the advantage of allowing independent removal of individual oxygen cathode without affecting other cathodes in the discharging assembly, and thus allowing convenient changing of cathodes or cleaning of the cell container when needed. It also has the advantage of maintaining the discharging function of the system when electrolyte leakage occurs in one oxygen cathode when there is a plurality of cathodes in the discharging assembly.

The cell container 110 (or tank) can be made of plastic materials. Preferably, the container is made of a continuous piece of plastic material with no discontinuity, such as holes and gaps, exists below the surface 401 (see FIG. 2a) of electrolyte such that there is no possibility of electrolyte leakage to outside of the cell. Particularly, a housing may be made of one or more materials that are implementable to air an electrolyte disposed in the housing. This is a particular advantage over the conventional designs of metal-air cells, in which the sides of cell container are covered by air electrodes and are prone to leaking of electrolyte. On cover 120 of the container, or alternatively on one side, there is a gas outlet with filter 420 (see FIG. 1a) to retain the electrolyte in the mist, containing mainly oxygen, generated during the operation of the system. There may be also catalytic material disposed in the filter 420 for recombination of the small amount of hydrogen that may be generated during the operation of the system as a side reaction. On the cover 120 there may also have other elements such as terminals for electrical conduction, air inlet and outlet, a motor or an air pump. The dimension and shape of the container 110 is determined according to the actual designs of the charging and discharging assemblies. The height of the cell container can be varied to change the space 102 (second space) and the storage space without affecting the structures of the charging and discharging assemblies of the cell. This flexible variation of the second space that change the volume of the storage space between the charging and discharging assemblies allows for variation of energy storage capacities with only marginal impact on the manufacturing and cost of the cell. As metallic material can be contained in the storage space to form pile 502 (see FIG. 2a) above the discharging assembly, the cell can have a large storage capacity or long runtime.

During the discharging operation of the cell, the discharging anodes 500 between the discharging cathodes are consumed as the metal deposit is dissolved and the dissolved metal in the electrolyte is transported out of the anode spaces with electrolyte via diffusion and convection and returns to the charging assembly. The material in pile 502 above the anodes falls into the anode spaces as the solid anode material is consumed, which maintains the electrochemical activity of the anodes.

Figure 6:
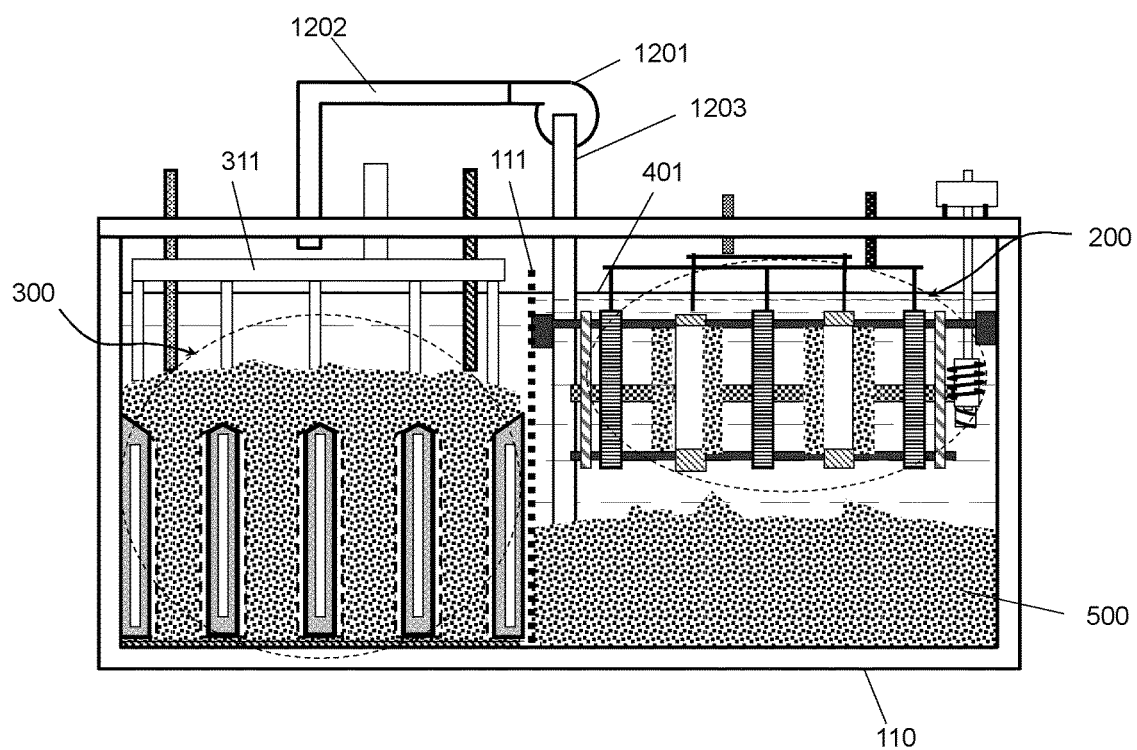
FIG. 6 A schematic illustration of an electrochemical cell in which the charging assembly is beside of the discharging assembly in the same container.

An alternative embodiment is to house the charging assembly and the discharging assembly side by side as illustrated in FIG. 6. The compartment of charging assembly and the compartment of the discharging assembly is separated by a divider 111 which is permeable to electrolyte and allows passing of electrolyte but not permeable to solid metal material such that the electrolyte is shared in both compartments. The metal deposits formed on the side of charging assembly is moved or transported to the side of discharging assembly by pump 1201 through pipes 1202 and 1203 and is placed into the spaces between the discharging cathodes. In the embodiment illustrated in FIG. 6, the electrodes of the charging assembly are parallel to the electrodes of the discharging assembly. Alternatively, it may be structured such that the electrodes of the charging assembly are perpendicular or in some other angle relative to the electrodes of the discharging assembly.

Figure 7A:
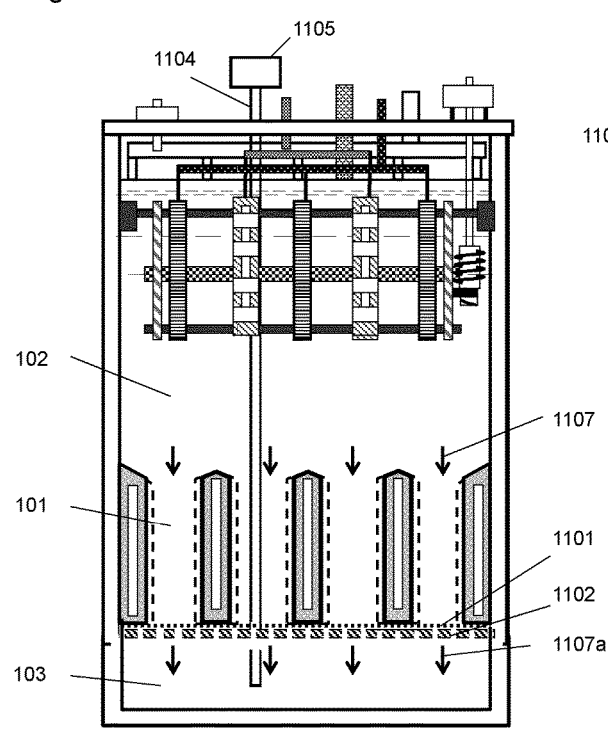
FIGS. 7 *a* and *b* A schematic illustration of an electrochemical cell that has the same structure of that shown in FIG. 1a with a chamber beneath the discharging assembly, (a) view from one side and (b) view with a right angle from the side illustrated in (a).
Figure 7B:
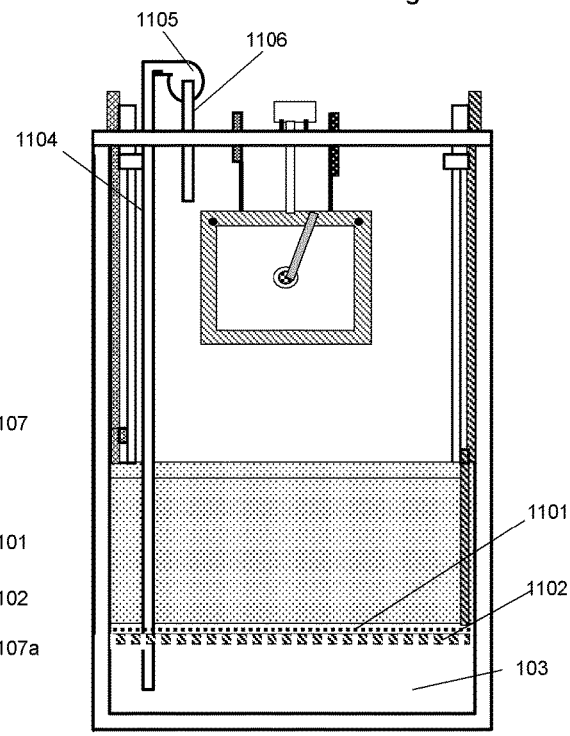

An alternative embodiment is to comprise a mechanism to circulate the electrolyte within the system. One mechanism for circulating electrolyte is to add a chamber that is in proximity, adjacent, next or close to the first space. FIGS. 7a and b shows the embodiment of the electrochemical system with a chamber 103 below the discharging assembly. The chamber is separated from the first space in the discharging assembly by a separator or a filter material 1101 that is supported by a perforated plate 1102. In operation the electrolyte can be circulated by a pump 1105 via pipes 1104 and 1106 among the first space, the second space and the chamber in either direction (in FIG. 8a direction of flow as indicated by 1007 and 1007a is from the second space to the first space to the chamber).

The electrolyte circulation as a forced convection can help the process of concentration homogenization of the electrolyte in different locations within the cell and can improve the performance of the electrochemical system particularly at high current densities. At high current densities, the metal concentration may be depleted near the cathode surfaces of the charging assembly during charging and may be highly concentrated in the anode spaces between oxygen cathodes of the discharging assembly during discharging. Electrolyte circulation can help increase the metal concentration near the cathode surfaces of the charging assembly and remove the dissolved metal in the discharging assembly.

The active metal for the reactions in the electrochemical cell system may be zinc, aluminum, magnesium, lead, and iron and their alloys. The metal or alloy may be further alloyed with other elements such as indium, bismuth, tin, gallium, antimony, calcium and cadmium for controlling hydrogen side reaction or morphology of the metal deposits.

The electrolyte may be an aqueous solution made of soluble chemicals of including but not limited to solutions of chlorides, sulfates, phosphates, hydrochloric acid, sulfuric acid, sodium hydroxide, potassium hydroxide and lithium hydroxide.

Depending on the active metal and electrolyte, the conductive material 231 of the cathodes of the charging assembly may be graphite, carbon, magnesium, aluminum, steel, copper, nickel, stainless steel, titanium and zirconium. The insulating material 232 may be plastics or ceramics. The anodes 220 of the charging assembly may be made of carbon, graphite, stainless steel, steel, titanium alloys, zirconium alloys and nickel alloys.

In a preferred embodiment, the active metal is zinc. The cathode substrate, the conductive material 231, for zinc deposition in the charging assembly may be made of metals or alloys including but not limited to magnesium, titanium, zirconium, tantalum graphite, and, steel, copper, nickel, stainless steel, chromium. The anodes in the charging assembly 220 may be made of metals and alloys including but not limited to steels, carbon, graphite, stainless steels, titanium, and nickel alloys.

As a preferred active metal, zinc has a unique set of technical and economical attributes including low equilibrium potential, good electrochemical reversibility, fast reaction kinetics, large over potential for hydrogen reaction, good conductivity, low equivalent weight, high specific energy, high volumetric energy density, abundance, low cost, low toxicity, and ease of handling (X. G. Zhang, Corrosion and Electrochemistry of Zinc, Springer 1996 and Zinc Electrodes, Encyclopedia of Electrochemical Power Sources, Elsevier, 2009). These attributes make zinc a favorable anode material for electrochemical power sources since the invention of battery two hundred years ago.

The good electrochemical reversibility and fast reaction kinetics mean zinc can dissolve and deposit readily near its equilibrium potential. The large over potential for hydrogen reaction means that zinc is stable in aqueous solutions and a high current efficiency during deposition. In a zinc-oxygen cell, zinc dissolves to form zincate ions during discharge and zincate ions are reduced to form metal deposit during charge according to the following equation:

$$Zn+4OH^-=Zn(OH)_4^{2-}+2e \quad E_0=-1.25V$$

Concurrently, oxygen is reduced during discharge and hydroxyl ions are oxidized during charge according to the following equation:

$$O_2+2H_2O+4e=4OH^- \quad E_0=0.4 \text{ V}$$

The overall reaction in the cell is $$Zn+O_2+4OH^-=Zn(OH)_4^{2-} \quad E_0=1.65V$$

In illustrative embodiments, zinc metal is deposited on the cathodes in the charging assembly. The deposited metallic zinc material is dislodged from the surface of the cathode periodically through a mechanical means such as wipers. The cathode substrate material for zinc deposition may be magnesium, titanium, zirconium, tantalum and their alloys or conductive substrates coated with these metals or alloys, on which the metal deposits may be easily removed by wipers. As a preferred embodiment the cathode for zinc deposition is made of magnesium or its alloys.

The electrolyte may be aqueous solutions of potassium hydroxide, sodium hydroxide or lithium hydroxide and is preferably potassium hydroxide. The concentration of potassium hydroxide solutions may range between 10 to 45%. Zinc has a high solubility in concentrated potassium solutions, about 1 molar at 35% KOH, and can form supersaturated solutions 2 to 3 times of the normal solubility, allowing storage of high content of potential energy in the solutions. The zinc metallic material may be alloyed with one or more other elements including but not limited to aluminum, magnesium, tin, bismuth, indium, gallium, lead, antimony and cadmium.

The zinc metal deposits formed in concentrated KOH may have a range of morphologies but it is most typically dendrite type. Dendritic zinc deposits are electrochemically very active and can be discharged with a good kinetics at a wide range of currents. The deposits are also physically loose due to the dendritic nature and can be easily removed from the surface of the cathode.

Figure 2D:
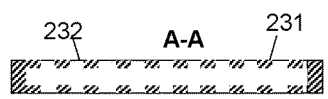
FIG. 2*d* A schematic illustration of the cathode of FIG. 2*c* taken along the lines A-A.

In a particular embodiment, the cathode 230 for zinc deposition comprises a plurality of discrete active surfaces made of conductive material 231. The discrete surfaces, on which metal is deposited, are isolated by insulating material 232 as indicated FIGS. 2c and 2d. The material deposited on such electrode can be more uniformly distributed in the anode spaces in the discharging assembly.

The electrochemical cell system can be used as an electrical storage system and a power source with variable storage and power capacity by connecting together individual cells, where a group of cells are in series connection. Individual cells or groups of cell series can also be connected in parallel depending on the design requirements for output voltage and current etc.

Figure 8A:
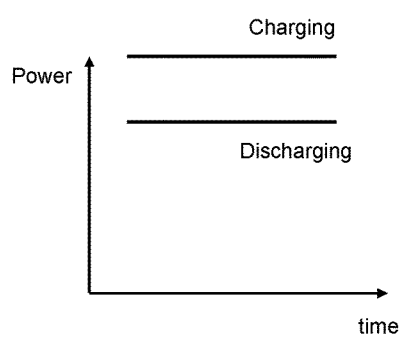
FIGS. 8 a and b A schematic illustration of power profiles for (a) concurrent charging and discharging (b) and alternating charging and discharging FIG. 9 A schematic illustration of power profiles of concurrent charging and discharging with a varying input power during charging and constant output power during discharging.
Figure 8B:
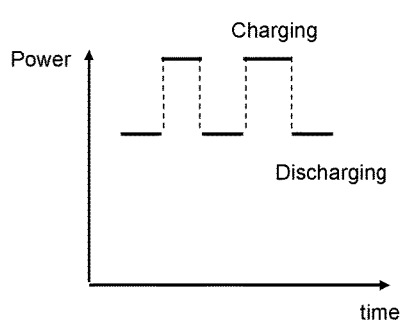

A novel feature of the electrochemical system is that the system can be used for storing electrical energy and providing power at the same time, that is concurrent charging and discharging or simultaneously, which is not possible with conventional batteries. FIGS. 8a and b show two charging and discharging profiles, wherein the charging and discharging are continuous with time in FIG. 8a, but are alternating with time in FIG. 8b. The system can function with both profiles while in contrast conventional batteries can only function with the alternating charging and discharging profile.

Figure 9:
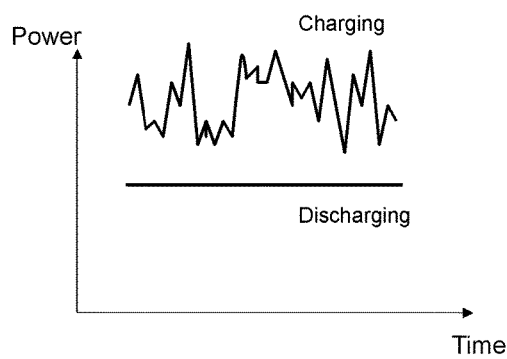

The concurrent charging and discharging can be used for many potential applications that are not possible with conventional batteries. For example, the system can convert unstable power, such as solar or wind power, into a stable power as illustrated in FIG. 9. Furthermore, it allows for full use of energy sources such as wind and solar without interruption unlike a conventional battery which needs to be discharged once it is fully charged.

Figure 10:
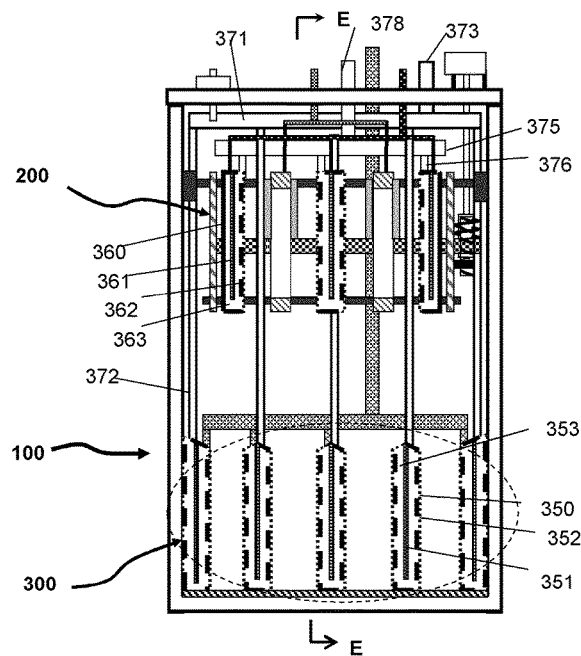
FIG. 10 A schematic illustration of the basic elements and structure electrochemical cell according to an embodiment, in which the oxidant is in liquid form such as bromine for the positive electrodes.
Figure 11:
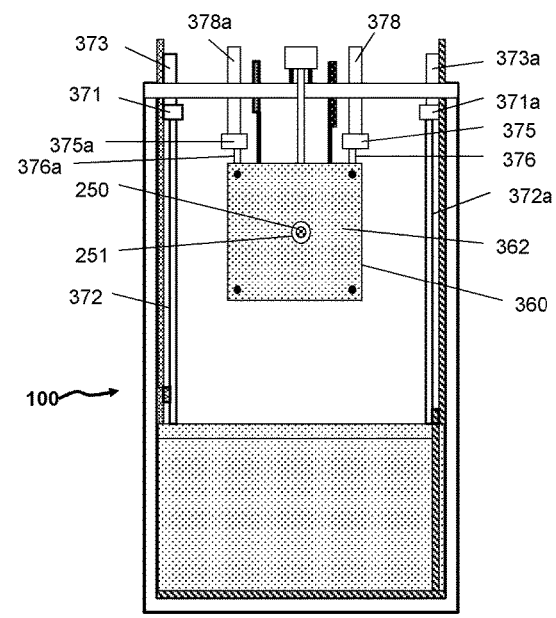
FIG. 11 A schematic illustration of the basic elements and structure of the electrochemical cell viewed from the plane and direction E-E as indicated in FIG. 10.

FIGS. 10 and 11 schematically illustrate another embodiment of the system which allows the use of liquid form of reactants instead of gaseous form like oxygen. Redox couples that may be suitable for use in this embodiment includes $Br_2/Br^-$, $Fe^{2+}/Fe^{3+}$, $Ce^{3+}/Ce^{4+}$, $VO^{2+}/VO_2^+$, and other redox couples that have a potential positive to that of zinc. The chemical agents of the redox couples can be dissolved in a suitable electrolyte with sufficient quantities and thus can be transported in a fluidic form.

As a specific embodiment, for example, the redox couple for the reactions on the positive electrodes is based on bromine and the metallic material is zinc, that is, it is a zinc-bromine chemistry. The reactions for this embodiment can be represented as follows (P. C. Butler et al, Zinc/Bromine Batteries in Handbook of Batteries, McGraw Hill):

| Negative electrode | $Zn - 2e = Zn^{2+}$ | $E^0 = 0.763$ V |
| Positive electrode | $Br_2 + 2r = Br^-$ | $E^0 = 1.087$ V |
| Total reaction | $Zn + Br_2 = ZnBr_2$ | $E^0 = 1.85$ V |

Figure 12A:
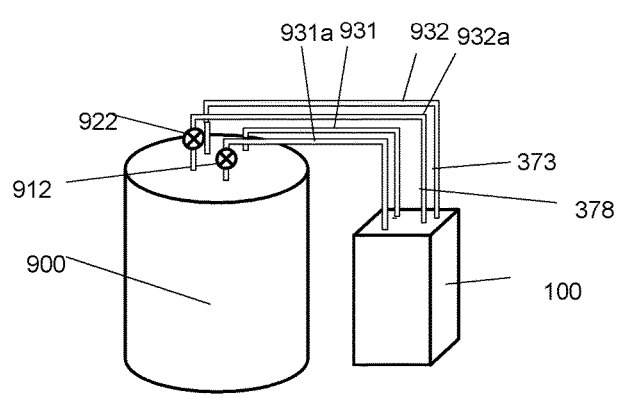
FIG. 12a A schematic illustration of an embodiment of the electrochemical system shown in FIG. 10 with an external tank for storing the liquid reactant that is circulated in and out of the electrochemical cell by pumps.

The electrochemical system using zinc-bromine reactions comprises two electrolytes, a negative electrolyte containing ZnBr and a positive electrolyte containing $Br_2/Br^-$. The two electrolytes are physically separated in order to prevent direct reaction between zinc and bromine. The negative electrolyte is stored inside the cell container 110. The positive electrolyte is stored in a tank 900 and is circulated in and out of the cell with pumps and pipes 912 and 922 as illustrated in FIG. 12. The size of the electrolyte tank for the positive electrolyte may vary depending on number of cells it connects with and the capacity of the cells.

Figure 12B:
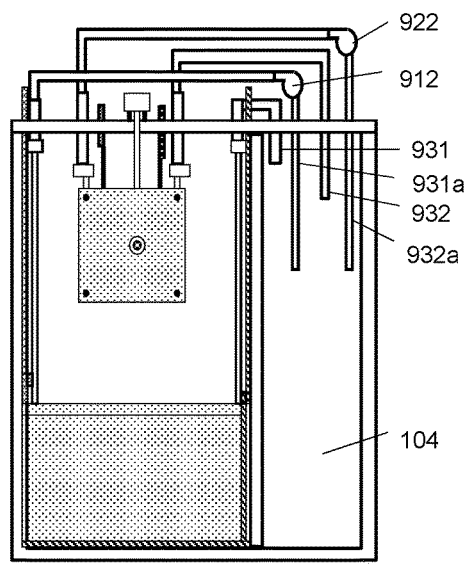
FIG. 12b A schematic illustration of an embodiment of the electrochemical system having a compartment in the cell housing for containing the liquid reactant for reactions involved with the positive electrodes.

For the embodiment illustrated in FIGS. 10 and 11, during charge zinc is deposited on the cathodes of the charging assembly while bromine ions in the electrolyte flowing through anode chambers 363 are reduced on electrodes 361. During discharge the zinc is oxidized into zinc ions in the discharge assembly while the bromine in the positive electrolyte flowing through the chambers 353 of the cathodes in the discharging assembly is reduced on electrodes 351. To separate the negative electrolyte and positive electrolyte, a separator or ionic selective membrane 352 and 362 covers the surfaces of the anodes in the charging assembly and the cathodes in the discharging assembly. The positive electrolyte is circulated through the anodes in the charging assembly via manifold (375), inlet (378) and outlet (378a); it is circulated through the cathodes of the discharging assembly via manifold (371), inlet (373) and outlet (373a). The two sets of inlets and outlets are connected via pipes (931, 931a, 932, and 932a) and valves (912 and 922) to an electrolyte container 900. As an alternative embodiment, the electrolyte for the positive electrode, that is, that containing bromine can be contained for each cell by adding a compartment 104 on the cell container as illustrated in FIG. 12b. It is to be noted that although it is not particularly exemplified for the zinc-bromine system all the alternative embodiments and possible variations described and illustrated for the system involving oxygen as the reactant for the positive electrodes may also be applicable the zinc-bromine system.

The embodiment for using redox reactions of bromine as the reactions for the positive electrodes has a big advantage over the current design of zinc-bromine flow batteries in which the capacity is limited by the thickness of the zinc electrode. The charging capacity and discharging capacity of the electrochemical system is not limited by the thickness of the deposit on the cathode of the charging assembly neither by the thickness of the anode of the discharging assembly. Another advantage is that the operation is insensitive to the morphology of the metal deposit and it allows formation of non-uniform deposits of zinc metallic material on the cathodes during charging; the formation of non-uniform deposits is detrimental for the zinc-bromine batteries of the current designs.

Figure 13:
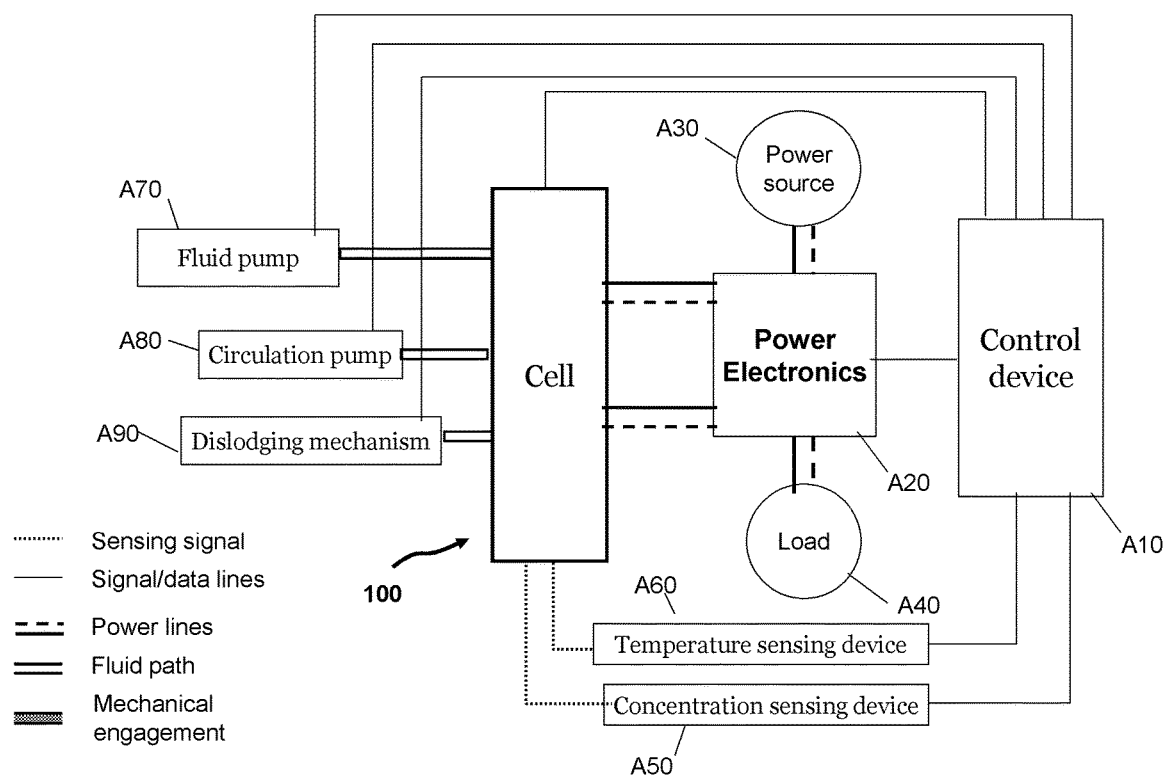
FIG. 13 A diagram illustrating the elements and operation scheme of an embodiment for the electrochemical system FIG. 14 A diagram illustrating the design for a algorithm with input parameters and output parameters FIG. 15 Change of charging current efficiency and morphology of deposited zinc metal in relation to zinc concentration in the electrolyte and the current density (based on apparent surface area of the cathodes).

An embodiment of the operation and control scheme of the electrochemical cell system is illustrated in FIG. 13. The charging and discharging powers of the cell 100 are regulated by a power electronic device A20 which is connected to an incoming power source A30 and a load A40. The metal concentration of the metallic material dissolved in the electrolyte and the electrolyte temperature are measured through a temperature sensing device A60 and a concentration sensing device A50. The data measured by the temperature sensing device and concentration sensing device is sent to a central control device A10, which may be a computer. This embodiment further comprises a fluid pump A70 for pumping a gaseous and/or liquid containing reactants for the positive electrodes in the cell system, which, for example, is air or oxygen-contain gas for zinc-oxygen chemistry or an bromine containing electrolyte for zinc-bromine chemistry. It further comprises an electrolyte pump A80 for circulating the electrolyte within the housing, and a motion mechanism A90 for dislodging the metallic material deposited on the charging cathodes. The fluid pump, electrolyte pump and the motion mechanism are controlled by the control device A10 as illustrated in FIG. 13. Depending on the design, the electrochemical cell system may further comprise a hydrogen sensing device to monitor the hydrogen concentration within and/or outside the housing, an electrolyte level sensor to detect the electrolyte level in the housing, and an air treatment system for conditioning the air or oxygen-containing gas by removing solid particles and carbon dioxide in the air, adjusting the relative humidity and temperature of the air or oxygen-containing gas, reservoirs for containing electrolyte for extra storage capacity or a second electrolyte (positive electrolyte in the case of a liquid form of reactant for the positive electrodes), and a water supply device to add water into the cell to maintain a specified electrolyte level.

Figure 14:
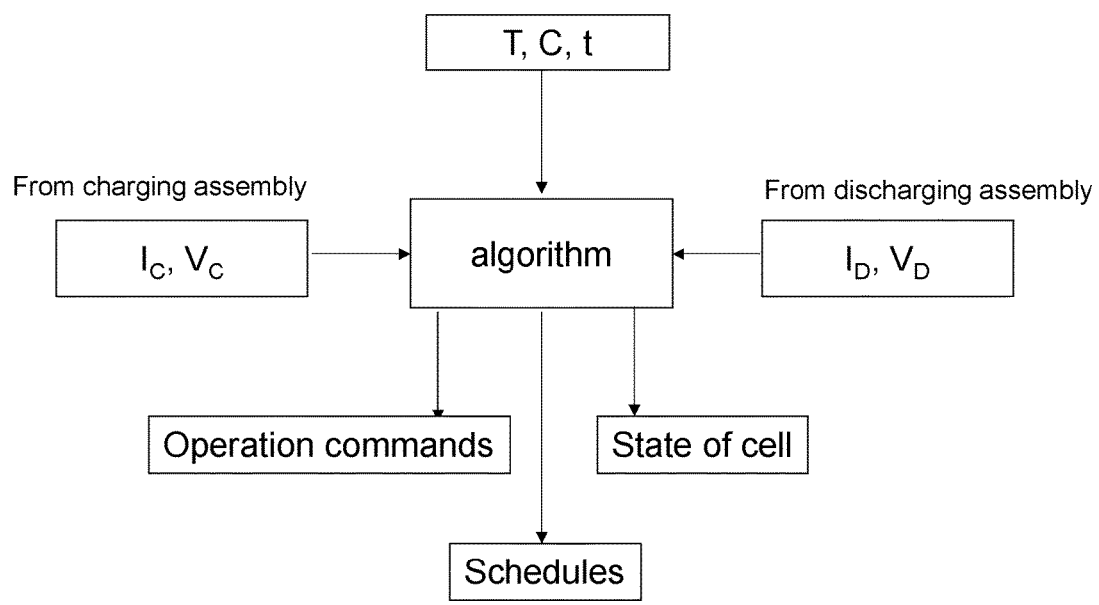

The control of the operation of the electrochemical cell system is realized with the control device through an algorithm that processes the data and information in the system, determines the state of the cell system, generates command instructions for the charging and discharging currents or voltages, and determines the schedules and operation modes of the pumps, dislodging mechanism and sensing devices. FIG. 14 is a schematic illustration for the design principle of one embodiment of the algorithm. In this embodiment, the current and voltage of the charging assembly $I_C$, $V_C$ and the current and voltage of the discharging assembly $I_D$, $V_D$, the temperature T and metal concentration C of the electrolyte, and time t are measured and the data is processed according to an algorithm programmed in the form of software operated in a computer. The algorithm comprises calculations and manipulations according to a set of rules designed for the power/capacity configuration and performance requirement of a specific cell system, as well as characteristics of functions and performance matrix required by actual applications. The software then generates operational commands such as actual values or magnitudes for the charging and discharging currents, and limits for charging and discharging currents and voltages, determines the state of cell system including depths of charge and discharge, charging and discharging efficiency, fraction of concurrent charging and discharging, and determines the schedules for the operation of the various components such as pumps, dislodging mechanism and sensing devices. The schedules and modes may include on and off times, flow rate for air and liquid circulation and motion speed of the wipers and they may be set based on time, or amount of charge passed through the charging assembly or the discharging assembly, or temperature, concentration, or currents and voltages of the charging and discharging electrodes, or combination of these parameters. As well, the schedule of each component may be set independently or coordinated with other components.

The metal concentration (C), which indicates the amount of metal in the electrolyte, is an important factor in an electrochemical system. It indicates the amount of the metallic material dissolved in the electrolyte. Zinc can be dissolved in a KOH electrolyte to a high concentration, much higher than the solubility, resulting in an oversaturated solution. A zinc oversaturated solution is rather stable; zinc oxide typically may not occur for days but the time for occurrence of oxide precipitation decreases with increasing the degree of oversaturation. The precipitation of oxide needs, preferably, to be avoided as it adds one solid phase in the system and makes the system more complicated. The solubility of zinc in 35% KOH solution is about 1M, that is, 65.4 g/l or 53.6 Ah/l (X. G. Zhang: "Zinc Electrodes", in Encyclopedia of Electrochemical Power Sources, Eds. Jungen Garche etc., Amsterdam: Elsevier, 2009). The solubility of electrochemically dissolved zinc is much higher than that from dissolution of ZnO, as much as three times higher, which results in a supersaturated solution. The energy capacity, in terms of the amount of the zinc dissolved in a supersaturated KOH or zinc concentration, can be as high as 192 Wh/l (assuming 3 times of super saturation and 1.2V of cell voltage). The effective energy density, or energy capacity density, measured against the volume of electrolyte can be determined according to the change of zinc concentration during charge and discharge; it is 64 Wh/l if the range of concentration change is 1M between fully charged and fully discharged states. The actual concentration range, thus effective energy density of a cell, may vary depending on specific product design and intended applications. Solid metal oxides may precipitate in supersaturated electrolyte, easier and faster with increasing the degree of super saturation. There is a range of concentrations for a smooth operation of the cell system; it is generally desirable for the system to operate without solid oxide precipitation. The electrochemical cell system in principle can operate in a supersaturated electrolyte containing certain amount of zinc oxide that is suspended in the electrolyte. The capacity density can be much higher, theoretically possible and potentially higher than 200 Ah/l, if the electrolyte is operated in an electrolyte containing suspended oxide than that without oxide.

Concentration also determines the amount of metallic material that can effectively be deposited from the electrolyte or the amount of metallic material that can be dissolved in the electrolyte and thus determines the state or depth of charge or discharge. It also determines the characteristics of the current and voltage relationships during charging and discharging, and affects the morphology of the deposit of the metallic material and the current efficiency of the deposition process. The effect of concentration depends on temperature (T) which affects the electrochemical reaction kinetics. The rate of a reaction generally increases with increasing temperature when other conditions are the same, meaning a higher current at a given electrode potential when temperature is higher.

Figure 15:
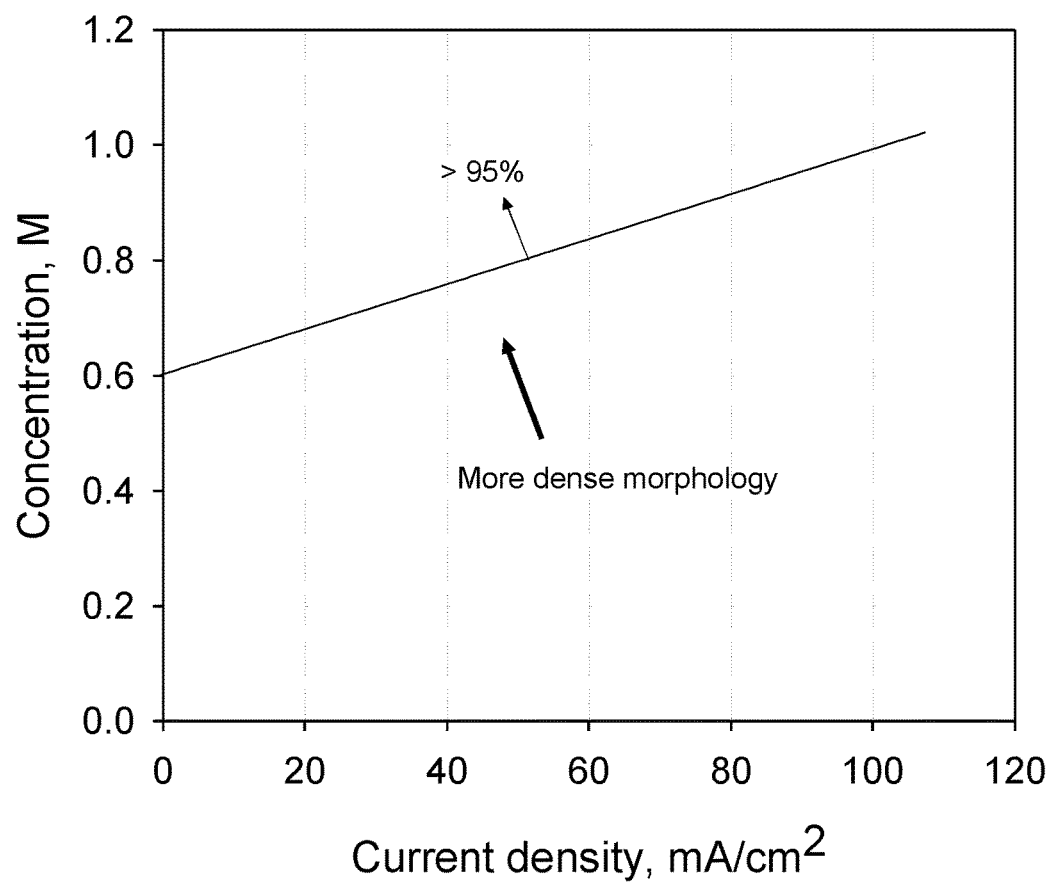

An experiment was set up to measure the effect of concentration of zinc in KOH solution on the deposition of zinc metal. In this experiment, a magnesium plate of 10 cm×10 cm with discrete active surface areas was used as the cathode. It has an apparent surface area of 100 cm$^2$ and total active surface area of 9 cm$^2$. A stainless steel plate is used as the anode and the distance between the cathode and the anode was 1 cm. The electrodes were placed in 1 litter of KOH electrolyte contained in a Plexiglas container. The experiment was conducted at room temperature, about 20 C. Electro deposition of zinc metal was conducted at different current densities in electrolytes of different zinc concentrations. For each test the total charge passed through the cathode was 2 Ah. The amount of deposited zinc metal was determined by weight measurement and the morphology of the deposits was visually evaluated. FIG. 15 shows the results of the experiment. The deposit is denser at a lower current density and a higher zinc concentration. The denser deposit appears to be darker and has finer dendritic crystallites, while the less dense deposit appears to be lighter, more metallic and has coarser dendritic crystallites. For current efficiency, which was determined by the amount of metal deposited divided by the theoretical amount calculated based the amount of charge passed. Lower current densities and higher concentrations result in higher current efficiency. Zinc metal deposition at conditions along the line in FIG. 15 has about 95% current efficiency. This line thus indicates a boundary conditions for the domain of concentration and current density: at left and above the line, the deposition current efficiency is higher than about 95% and below and at right of the line the deposition current efficiency is lower than about 95%.

Low metal concentration in the electrolyte is favorable for dissolution as reaction kinetics becomes slower at a higher concentration of the dissolved metal. The metal electrode may become passivated at a certain high metal concentration, which tends to occur near the electrode surface during dissolution reaction of the metal anode. For a zinc anode, it is important to maintain an operation condition such that passivation does not occur (Zinc Electrodes, Encyclopedia of Electrochemical Power Sources, Elsevier, 2009).

Figure 16:
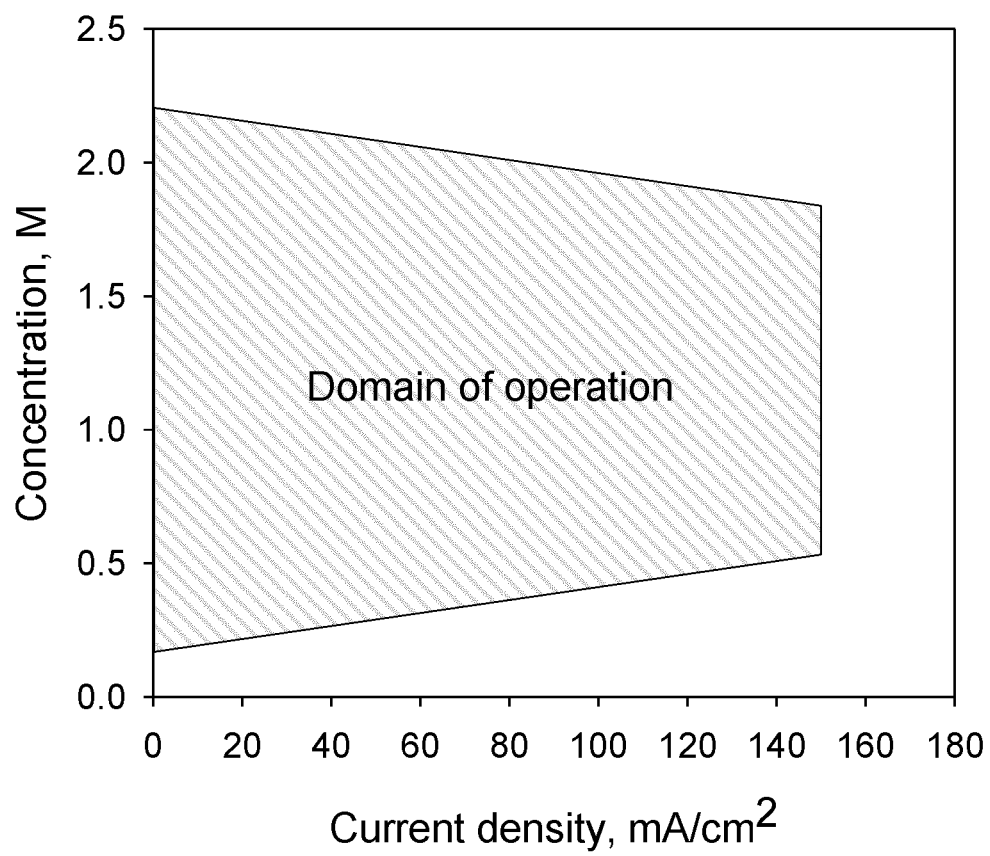
FIG. 16 Domain of operation in relation to zinc concentration and the apparent current density (based on the apparent surface area of the cathodes).

The system is functional in a wide range of concentrations and current densities. The operation of a zinc-oxygen electrochemical system is preferably operated in a domain illustrated in FIG. 16 considering the effect of concentration on zinc metal deposition, dissolution, and formation of zinc oxide precipitates. The charging and discharging is preferably carried out in a concentration range between 0.2 M to 2.2 M and in an apparent current density not exceeding 150 mA/cm². At an apparent current density close to 150 mA/cm² it is preferably operated in the concentration range between 0.5M and 1.8M. The preferable domain of operation is within the lines defined by the four coordinates: 0.2M-0 mA²; 0.5M-150 mA/cm²; 2.2M-0 mA/cm²; and 1.8M-150 mA/cm².

Metal concentration in an electrolyte can be determined through measurement of physical and chemical properties of the electrolyte. These properties include conductivity, resistivity, conductance, density, viscosity, surface tension, potential of a redox couple, refraction index, temperature, and reflectance. It may also be determined according to the electrical characteristics of the cell system such as potentials of the cathodes or anodes, voltage between charging anodes and cathode, voltage between discharging cathodes and anodes, current and voltage relationship, reaction impedance, and amount of charge passed during charging and discharging. It is also possible to determine the concentration based on the amount of metallic zinc material in the spaces between the discharging cathodes and the storage space above the discharging cathodes.

As an example, the concentration of a metal in an electrolyte can be measured with the redox potential of the metal using a reference electrode of a known potential value. For zinc in an alkaline electrolyte the redox potential of can be expressed with the Nernst equation (M. Pourbaix, Atlas of Electrochemical Equilibria in Aqueous Solutions, NACE, 1974, page 408):

$$E_0 = 0.441 - 0.1182\, pH + 0.0295\, \log(Zn(OH)_4{}^{2-})\,V$$

Where $(Zn(OH)_4{}^{2-})$ is the concentration of zinc. In practice, the redox potential of zinc in alkaline electrolytes may be measured against a reference electrode, for example, the calomel electrode based on the redox couple of Hg/HgO, which has a stable value in an alkaline solution.

Figure 17:
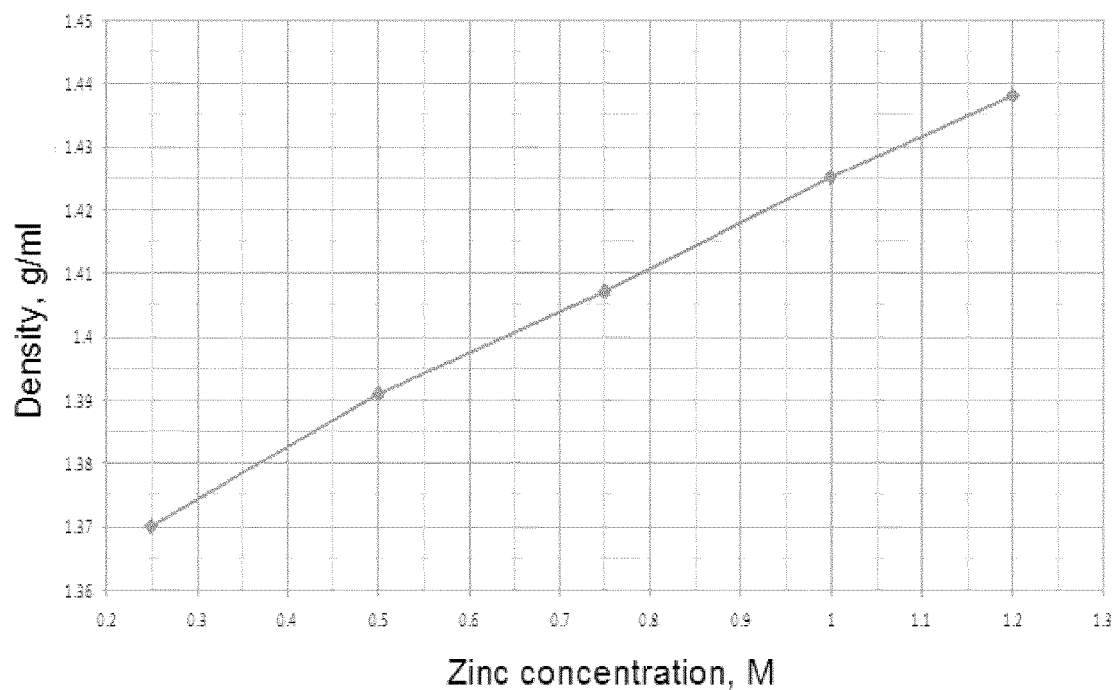
FIG. 17 Relationship between zinc concentration of 34% KOH solution and density of the solution measured by hydrometer.

As another example, there is a relationship between zinc concentration and density of KOH electrolyte as illustrated in FIG. 17. Thus the concentration of an electrolyte can be determined by measuring the density of the electrolyte.

Figure 18:
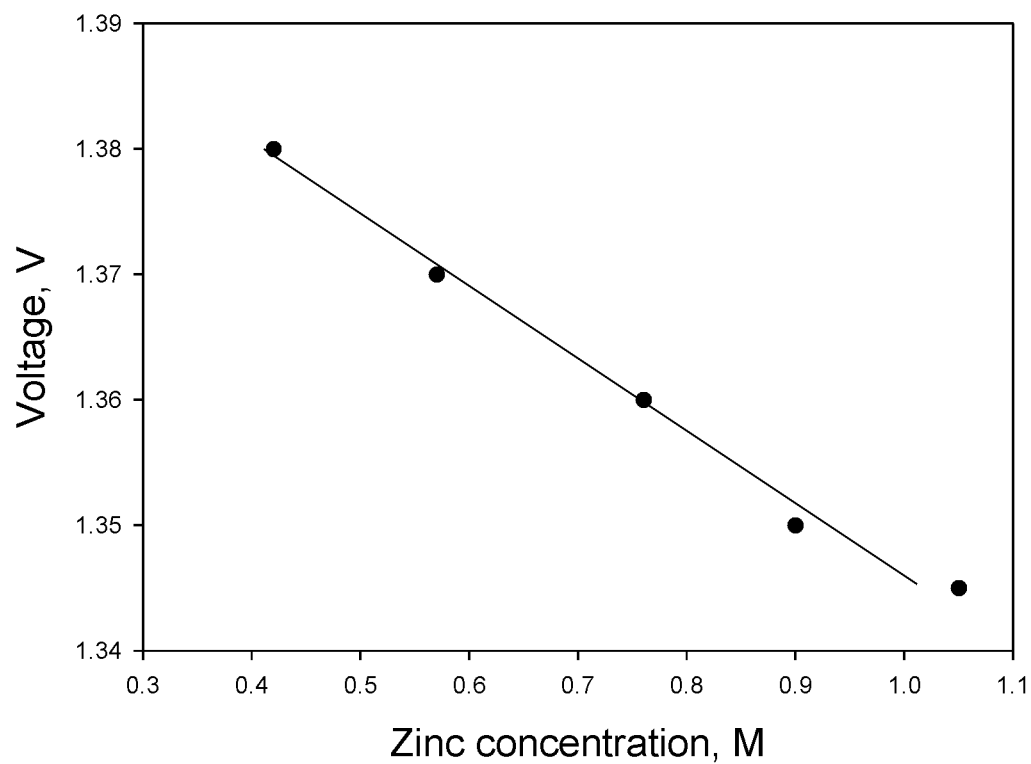
FIG. 18 Voltage between zinc anode and air cathode measured at a current of 1 A as a function of zinc concentration in 34% KOH electrolyte in a cell of 27 cm (length)× 11.5 cm (width)×55 cm (height) containing 14 liters of electrolyte; the dimension of the three air cathodes is 14 cm×26 cm and the total apparent surface area of the air cathodes is 1200 $cm^2$.
Figure 19:
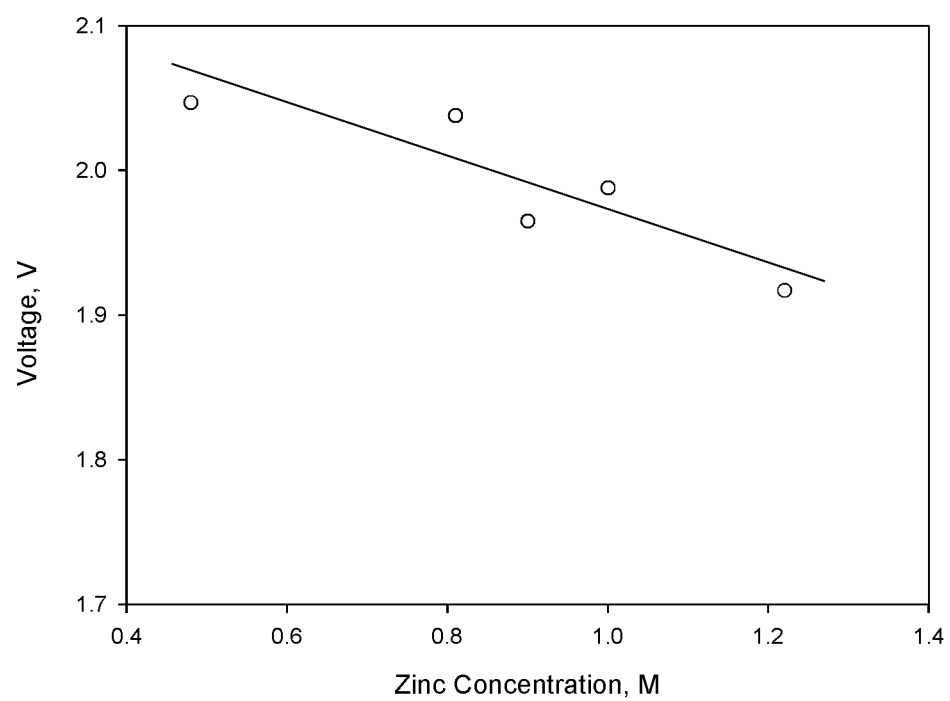
FIG. 19 Voltage between the charging cathode and anode measured at a current of 1 A as a function of zinc concentration in 34% KOH electrolyte in a cell of 27 cm (length)× 11.5 cm (width)×55 cm (height) containing 14 liters of electrolyte; the dimension of the three charging cathodes is 20 cm×23 cm and the total apparent surface area of the cathodes is 1600 $cm^2$.

As another example, there is a correlation between zinc concentration and voltage between charging cathodes and anodes or that between the discharging cathodes and discharging anodes in a given cell. FIG. 18 shows a correlation between the concentration of the electrolyte and the voltage between zinc anodes and air cathodes in the cell. FIG. 19 shows a correlation between zinc concentration and the voltage between the charging cathodes and charging anodes. Thus, once such a correlation is established for a cell of a specific design, it can be used to determine the concentration of zinc in the electrolyte undergoing a charging or a discharging operation, based which the condition of the cell such as depth of discharge, capacity etc, may be determined and operation control can be realized.

Figure 20:
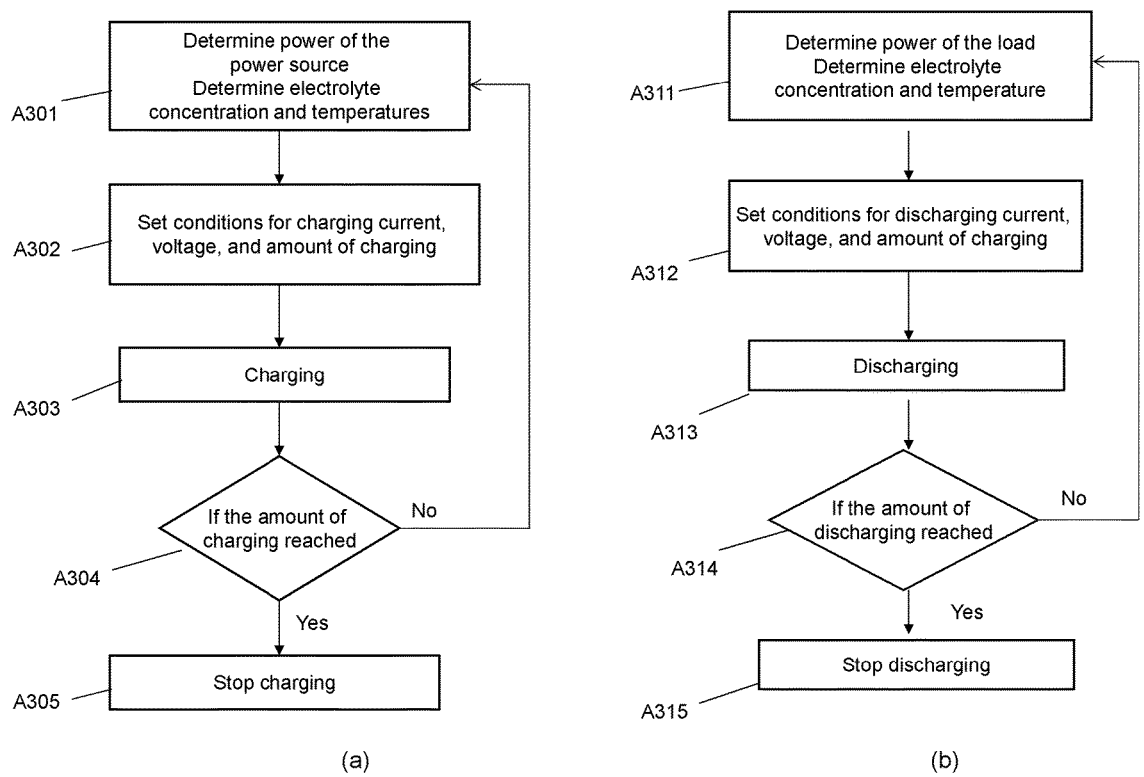
FIG. 20 Flow charts for a charging operation (a) and a discharging operation (b)

FIG. 20 illustrates the flow charts for an embodiment of the operation method; FIG. 20(a) is the flow chart of a charging operation and FIG. 20(b) is a discharging operation. For the charging operation, in step A301 the power character of the power source is determined in terms of voltage and current relation and its variation with time. The power may greatly change with time in the case of wind or solar power. The electrolyte concentration and temperature in the cell are also determined in step A301. In step A302 the control device then sets the parameters for charging including but not limited to charging current, variation of current with time, voltage limits and length of charging. The length of charging may be specified based on time, amount of charge passed, voltage or concentration of the electrolyte. In A303 the charging assembly is activated to start charging according to the parameters set in step A302. During charging the actual length of charging is compared to the specified length of charging in decision block A304. If the actual length of charging is less than the specified length the operation loops back and proceed through to steps A301, A302 and A303 in which a new set of conditions for power, electrolyte and temperature are determined and a new set of operation parameters are set for the ongoing charging. The operation proceeds step A304 when the length of charging or the amount of charging is reached and in step A304 the charging is stopped. The discharging operation is conducted through steps A311, A312, A313, and A315 and decision block A314 similarly as the charging operation described above.

Figure 21:
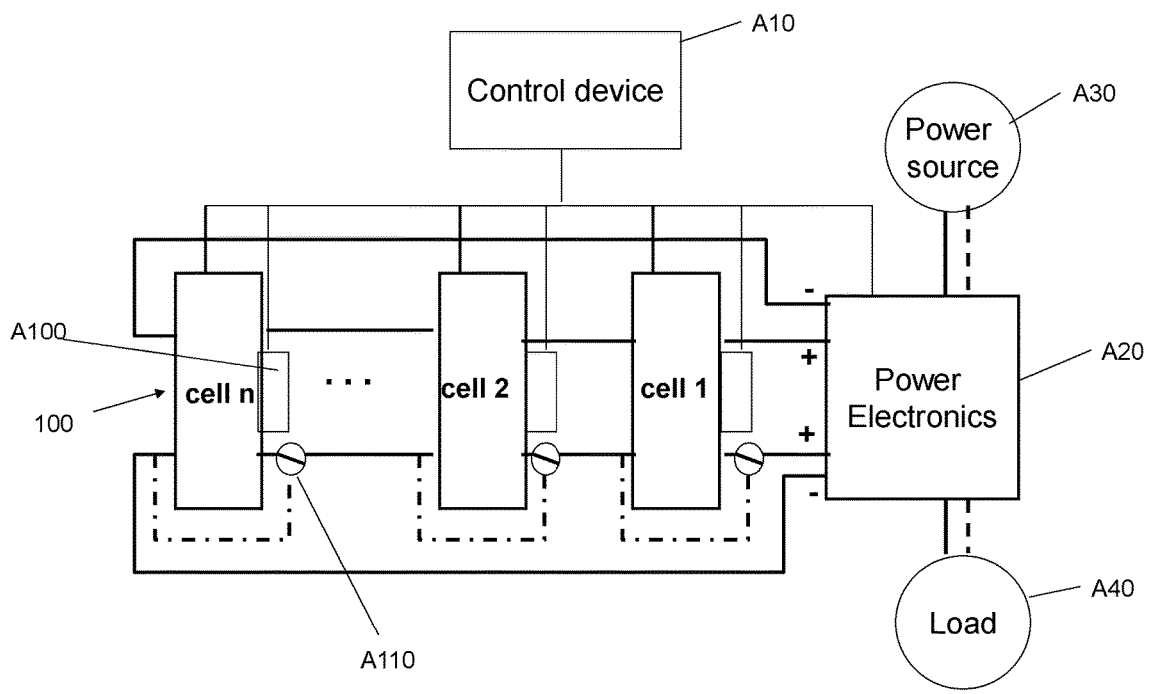
FIG. 21 Schematic illustration of the connections of a system with a plurality of cells; the cells are connected in series FIG. 22 Schematic illustration of the connections of a system with a plurality of cells; the cells are connected in parallel FIG. 23 Flow chart for an operation of setting up the cell with specified amount of electrolyte and metallic material for individual cells FIG. 24 Schematic illustration for an operation to empty a cell (a), to wash the interior of the cell (b) and to replace a discharging cathode
Figure 22:
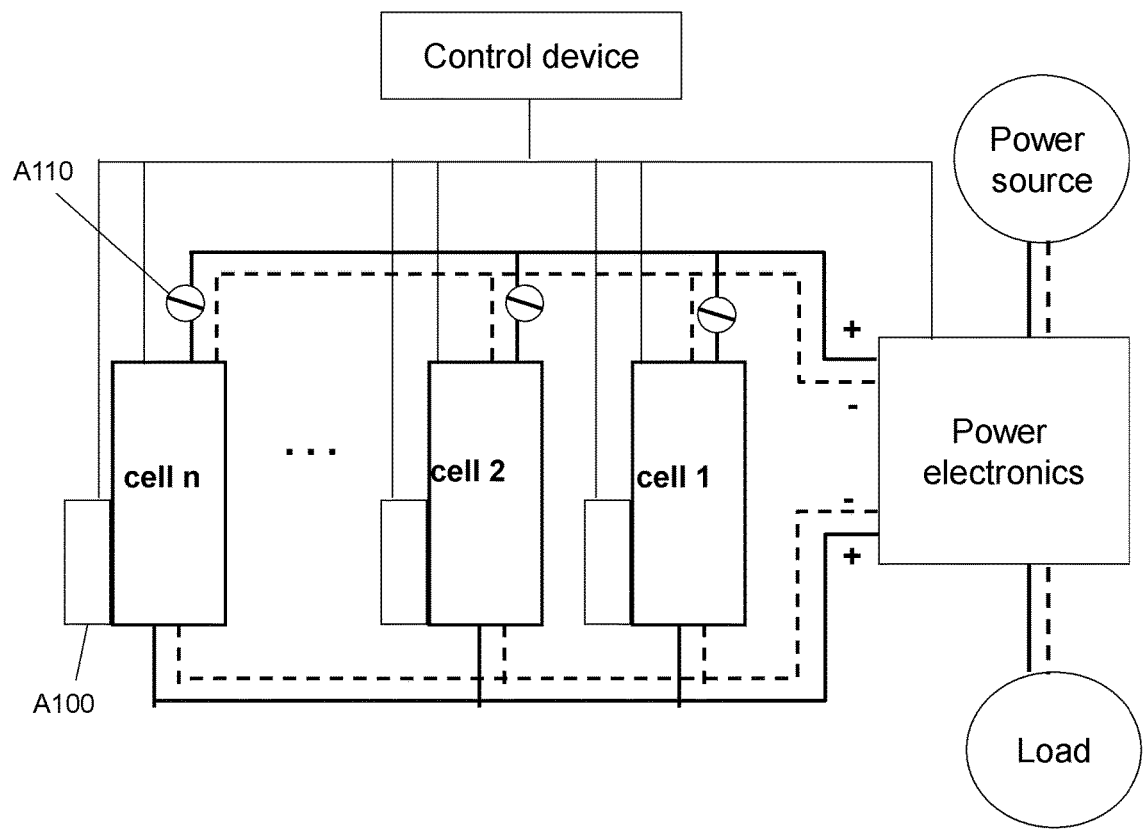

A plurality of cells may be connected to make an energy storage system of a larger capacity and a higher power. The cells may be connected in series or parallel as illustrated in FIGS. 21 and 22, respectively or a combination of serial and parallel connections (not shown). The cells are connected to the power electronic device that regulates the incoming power from the power source A30 and outgoing power to the load A40. The cells are also connected to the control device for monitoring signals from the cell including currents and voltages for the charging and discharging assemblies, temperature and concentration. The control device is connected to the power electronic and connected all other devices or components that are associated with the system. A110 includes the various components such as pumps and sensing devices that may be used for operation of the cell. For a system comprising a plurality of cells, some of the components may be shared by more than one cell. For example, supply of air to all cells may comprise only one pump and a manifold to distribute the air to the individual cells. Similarly, the liquid pump for the electrolyte circulation and the dislodging mechanism may be shared by more than one cell to improve the operation efficiency and manufacturing cost of the system.

Since each cell may have variations in the cell construction and in the function of the components, energy capacity or depth of discharge may change and differences may develop between the cells after extended operation. A maintenance procedure may be applied to rebalance the cells, in which individual cell may be charged or discharged for a certain amount of charge such that all the cells return to same depth of charge or discharge. This can be realized by introducing a relay for each cell in the case of parallel connection shown in FIG. 22 and a relay plus a bypass in the case of series connection as shown in FIG. 21. The bypass and the relay may be placed in the current paths connected to the charging assemblies or to the discharging assemblies.

Figure 23:
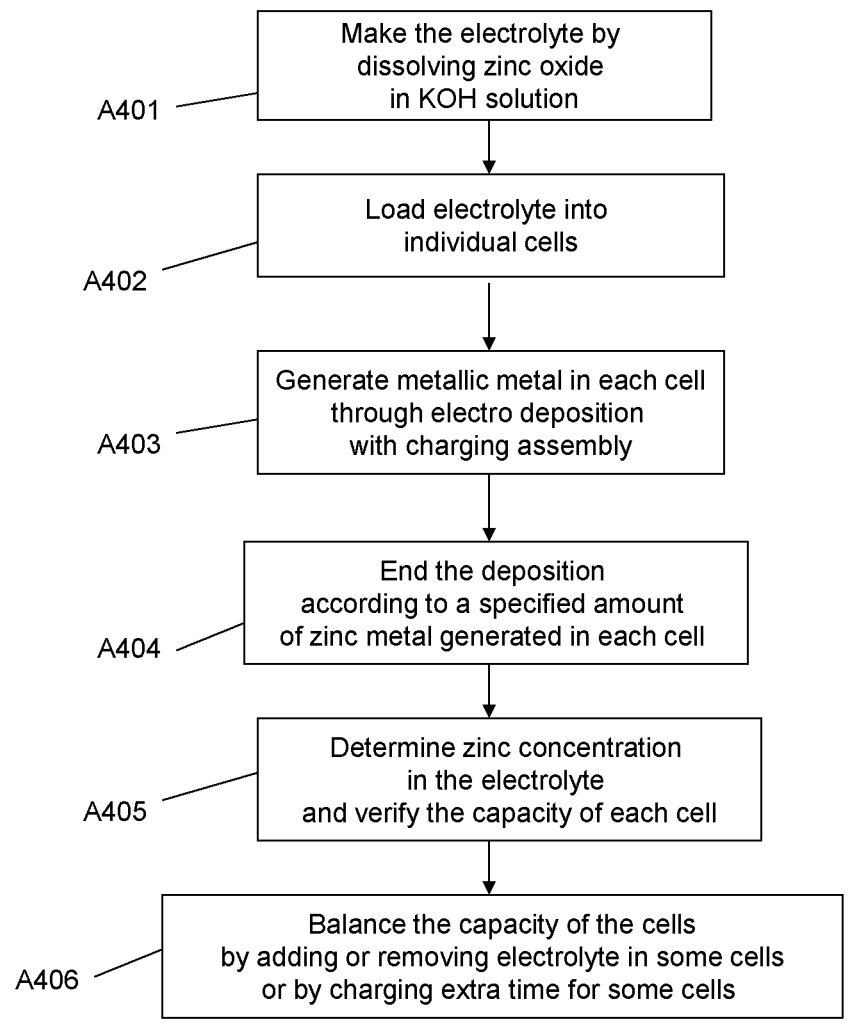

FIG. 23 shows a flow chart for an operation embodiment for setting up the cells with the electrolyte and the metallic material. In step A401, the electrolyte is made in a bulk quantity (a large amount in a large container) by dissolving a specified amount of zinc oxide in a KOH solution of certain concentration. In step A402, the electrolyte is loaded into individual cells to a specified level or quantity. In the next, A403, the metallic zinc material is being generated through charging. In step A404, the charging is ended when a specified amount of metallic material is generated. In step A405, the concentration of the electrolyte is determined to verify whether the state of charge or discharging capacity (amount of the metallic material) is within the operation specification. If the state of charge or discharge capacity of some cells are not within the range of specification, a balancing procedure A406 is applied by adding or removing the amount of the electrolyte in some cells or charging or discharging some cells for extra time until the state of charge of all the cells are balanced, i.e., within the range of specification. The cells are then ready electrochemically for charging and discharging operation. Alternatively, after step A402, instead of making the metallic material in the cells, the metallic material that is generated separately outside of the cell may be loaded into the cells. The metallic material may be generated in a centralized charging system, which in certain situations may have economic benefit.

Figure 24:
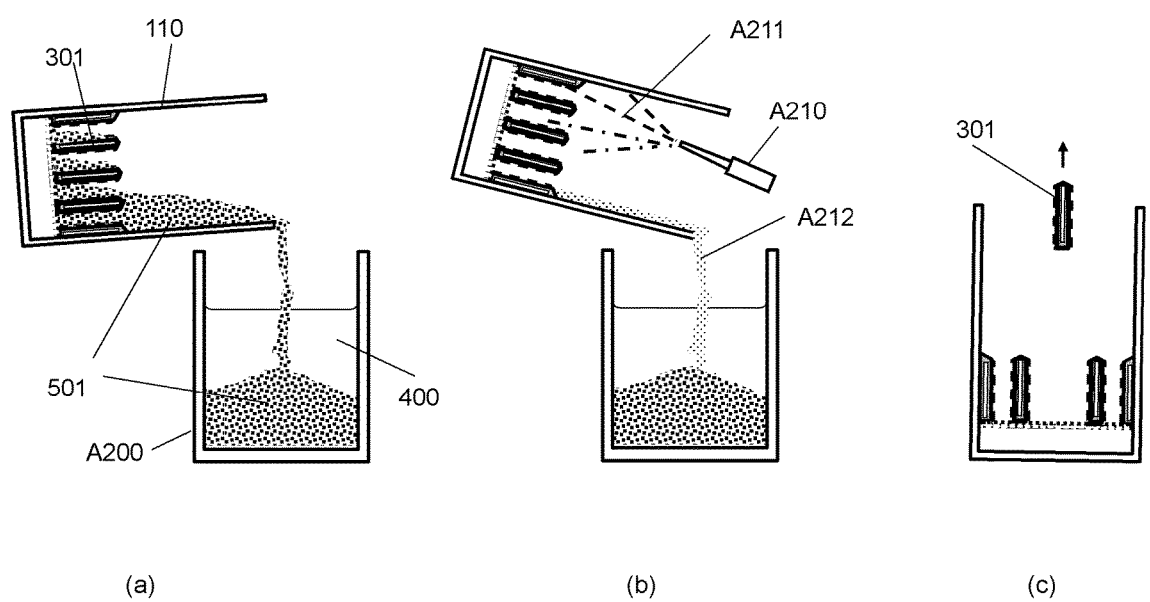

In the event of a problem in a cell, for example, leaking of a discharging cathode, the cell container 110 can be emptied by pouring the electrolyte 400 and the metallic material 501 out of the cell and into a container A200 as illustrated in FIG. 24(a). The interior of the cell container can be washed, as illustrated in FIG. 24(b), with an electrolyte spray A211 taking from the container A200 with a nozzle A210 and a pump (not shown). The mix A212 of the electrolyte from the spray and the metallic material left in the cell flows into the container. The interior of the container may be further rinsed with water. The cell can then be inspected for the problem and in the example of leaked discharging cathode, the cathode can be removed and replaced with a new discharging cathode as illustrated in FIG. 24(c). The operation illustrated in FIG. 24 can be readily used in the field as a maintenance and service procedure when a cell needs to be repaired.

The principle and the particular embodiments of the electrochemical system may also be applicable to other type of cells that operate with the active metallic material detached from the electrodes, that is, removing the metallic electrode material from the electrodes and storing the metallic material separately. For example, it may be applied to the embodiments and their various possible variations disclosed in co-pending and co-owned US patent application publication 2015/0056524 (published Feb. 26, 2015).

The system or method described herein has significant advantages over prior art metal fuel cells including at least: 1) it resolves the challenging problems relating to feeding metallic materials into individual cells and removing discharged material out of cells without clogging or jamming; 2) it allows the oxygen cathode to be constructed as a self contained component, like an air cartridge allowing air to pass through, and can be independently removed from the discharging assembly. It thus allows convenient removal of individual air cathodes for service and maintenance without affecting the integrity of the cell; and 3) it allows the use a container made of single continuous piece of plastic material to contain all elements that are in touch with electrolyte inside the container, which removes the possibility of potential electrolyte leaking out the cell. In comparison to conventional batteries, the electrochemical system or method has advantages of: 1) it can perform concurrent charging and discharging functions; 2) it allows large capacities and flexible and low cost capacity scaling; 3) it allows charging and discharging to be operated at different locations; and 4) it allows energy storage for long times at low cost as on the active materials (without electrodes) can be stored in simple plastic containers. The electrochemical system or method can potentially be used in a wide range of applications including but not limited for: 1) economical storage of renewable energy such as solar and wind; 2) improving the stability and efficiency of electrical grid; 3) as the storage device for off-grid or micro grid distributed power source systems; 4) as back up or UPS power sources: 5) as power sources for mobile applications; and 6) back up long term electricity storage for emergency situations and for situations when there is interruption of electricity supply from renewable energy sources due to bad weather.

Embodiments disclosed herein, or portions thereof, can be implemented by programming one or more computer systems or devices with computer-executable instructions embodied in a non-transitory computer-readable medium. When executed by a processor, these instructions operate to cause these computer systems and devices to perform one or more functions particular to embodiments disclosed herein. Programming techniques, computer languages, devices, and computer-readable media necessary to accomplish this are known in the art.

The computer readable medium is a data storage device that can store data, which can thereafter, be read by a computer system. Examples of a computer readable medium include read-only memory, random-access memory, CD-ROMs, magnetic tape, optical data storage devices and the like. The computer readable medium may be geographically localized or may be distributed over a network coupled computer system so that the computer readable code is stored and executed in a distributed fashion.

Computer-implementation of the system or method typically comprises a memory, an interface and a processor. The types and arrangements of memory, interface and processor may be varied according to implementations. For example, the interface may include a software interface that communicates with an end-user computing device through an Internet connection. The interface may also include a physical electronic device configured to receive requests or queries from an end-user.

Any suitable processor type may be used depending on a specific implementation, including for example, a microprocessor, a programmable logic controller or a field programmable logic array. Moreover, any conventional computer architecture may be used for computer-implementation of the system or method including for example a memory, a mass storage device, a processor (CPU), a Read-Only Memory (ROM), and a Random-Access Memory (RAM) generally connected to a system bus of data-processing apparatus. Memory can be implemented as a ROM, RAM, a combination thereof, or simply a general memory unit. Software modules in the form of routines and/or subroutines for carrying out features of the system or method can be stored within memory and then retrieved and processed via processor to perform a particular task or function. Similarly, one or more method steps may be encoded as a program component, stored as executable instructions within memory and then retrieved and processed via a processor. A user input device, such as a keyboard, mouse, or another pointing device, can be connected to PCI (Peripheral Component Interconnect) bus. If desired, the software may provide an environment that represents programs, files, options, and so forth by means of graphically displayed icons, menus, and dialog boxes on a computer monitor screen.

Computer-implementation of the system or method may accommodate any type of end-user computing device including computing devices communicating over a networked connection. The computing device may display graphical interface elements for performing the various functions of the system or method. For example, the computing device may be a desktop, laptop, notebook, tablet, personal digital assistant (PDA), PDA phone or smartphone, gaming console, portable media player, and the like. The computing device may be implemented using any appropriate combination of hardware and/or software configured for wired and/or wireless communication. Communication can occur over a network, for example, where remote control of the system is desired.

If a networked connection is desired the system or method may accommodate any type of network. The network may be a single network or a combination of multiple networks. For example, the network may include the internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet. For example, the network may comprise a computer network that makes use of a TCP/IP protocol (including protocols based on TCP/IP protocol, such as HTTP, HTTPS or FTP).

Embodiments described herein are intended for illustrative purposes without any intended loss of generality. Still further variants, modifications and combinations thereof are contemplated and will be recognized by the person of skill in the art. Accordingly, the foregoing detailed description is not intended to limit scope, applicability, or configuration of claimed subject matter.

What is claimed is:

1. A method for operating an electrochemical cell system, the electrochemical cell system comprising:

a housing;
an electrolyte disposed in the housing;
a metallic material;
a plurality of charging anodes and a plurality of charging cathodes at least partially immersed in the electrolyte;
a plurality of discharging cathodes immersed in the electrolyte;
a plurality of anode spaces adjacent the discharging cathodes, and
wherein:
    the metallic material is electrochemically deposited on the charging cathodes during charging;
    the metallic material, when positioned in the anode spaces, forms a plurality of discharging anodes; and
    the metallic material is electrochemically dissolved during discharging;
the method comprising:
    determining the metal concentration of the dissolved metallic material in the electrolyte;
    passing an electric current to the charging cathodes and charging anodes during charging, the ranges of the electric currents being determined according to the metal concentration of the electrolyte; and
    passing an electrical current to the discharging cathodes and discharging anodes during discharging, the range of the electric currents being determined according to the metal concentration of the electrolyte.

2. The method of claim 1, further comprising a software algorithm for determination of one or more parameters selected from the group consisting of depth of charge or discharge, current efficiency of charging, current efficiency of discharging a schedule for dislodging of metallic material, and a schedule for electrolyte circulation according to the operation conditions comprising concentration of electrolyte, temperature, charging or discharging current, charging and discharging voltage, and time and duration of charging or discharging.

3. The method of claim 1, wherein the metal is zinc and the electrochemical reactions on the discharging cathodes and charging anodes involving oxygen from air.

4. The method of claim 1, wherein the concentration of the metallic material dissolved in the electrolyte is determined through measurements of one or more properties of the electrolyte from the group including conductivity, resistivity, conductance, density, viscosity, impedance, temperature, reflectance, deflection index, surface tension, potential of a redox couple, cell voltage, and current and voltage relationship.

5. The method of claim 1, wherein the density of the electric current supplied to the charging electrodes or discharging electrodes is in the range between 1 mA/cm$^2$ and 150 mA/cm$^2$ based on the apparent surface area of the charging cathodes or the discharging cathodes.

6. The method of claim 1, wherein the electrochemical system is operated within a dissolved metal concentration of the electrolyte in the range between 0.2 molar and 2.2 molar.

7. The method of claim 1, wherein the electrochemical system is operated in the electrolyte containing suspended oxide of the metal.

8. The method of claim 1, wherein the metallic material deposited on the charging cathodes is dislodged intermittently at a scheduled time or when a predetermined amount of charge is passed through the charging cathodes.

9. The method of claim 1, further comprising circulating the electrolyte at a scheduled time or when a predetermined amount of charge is passed through the charging cathodes.

10. The method of claim 1, wherein one or more cells are electrically connected in parallel or in series or a combination of in-parallel and in-series connections.

11. The method of claim 8, wherein the capacity of each cells are balanced by applying a maintenance procedure comprising passing current through selected cells according to the concentration of the electrolyte in each cell.

12. The method of claim 1, wherein the electrochemical cell system stores electrical energy when the metallic material is electrochemically deposited and electrochemical cell system generates electrical energy when the metallic material is electrochemically dissolved.

13. The method of claim 12, wherein the electrochemical cell system stores and generates simultaneously when the deposition of the metallic material and the dissolution of the metallic material occur at the same time.

14. The method of claim 1, further comprising a procedure for maintenance or service of the cell by pouring out the electrolyte and metallic material in the housing into a separate container and replacing a damaged discharging cathode with a new discharging cathode.

15. The method according to claim 1, wherein
a range of the electrical currents or voltages applied to the plurality of charging anodes and plurality of charging cathodes during charging and to the plurality of discharging cathodes and plurality of anode spaces during discharging according to the metal concentration of the electrolyte are determined.

16. The method of claim 15, wherein the metallic material is zinc and the electrochemical reactions on the discharging cathodes and charging anodes involving oxygen from air.

17. The method of claim 15 further comprising a software algorithm for determination of one or more parameters selected from the group consisting of depth of charge or discharge, current efficiency of charging, current efficiency of discharging a schedule for dislodging of metallic material, and a schedule for electrolyte circulation according to the operation conditions comprising concentration of electrolyte, temperature, charging or discharging current, charging and discharging voltage, and time and duration of charging or discharging.

18. The method of claim 15, wherein the concentration of the metallic material dissolved in the electrolyte is determined through measurements of one or more properties of the electrolyte from the group including conductivity, resistivity, conductance, density, viscosity, impedance, temperature, reflectance, deflection index, surface tension, potential of a redox couple, cell voltage, and current and voltage relationship.

19. The method of claim 15, wherein one or more cells are electrically connected in parallel or in series or a combination of in-parallel and in-series connections.

20. The method of claim 15, wherein the electrochemical system stores and generates electricity simultaneously when the deposition of the metallic material and the dissolution of the metallic material occur at the same time.

* * * * *